(12) United States Patent
Zhang et al.

(10) Patent No.: US 12,207,255 B2
(45) Date of Patent: Jan. 21, 2025

(54) TECHNIQUES FOR INDICATING AND UPDATING TRANSMISSION OCCASIONS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/479,689

(22) Filed: Oct. 2, 2023

(65) Prior Publication Data

US 2024/0107534 A1    Mar. 28, 2024

Related U.S. Application Data

(63) Continuation of application No. 17/386,221, filed on Jul. 27, 2021, now Pat. No. 11,805,517.

(51) Int. Cl.
*H04W 72/1273* (2023.01)
*H04L 1/00* (2006.01)
*H04L 5/14* (2006.01)
*H04W 72/1268* (2023.01)
*H04W 72/23* (2023.01)

(52) U.S. Cl.
CPC ....... *H04W 72/1273* (2013.01); *H04L 1/0003* (2013.01); *H04L 1/0025* (2013.01); *H04L 5/14* (2013.01); *H04W 72/1268* (2013.01); *H04W 72/23* (2023.01)

(58) Field of Classification Search
CPC ......... H04W 72/1273; H04W 72/1268; H04W 72/23; H04W 72/21; H04W 72/11; H04L 1/0003; H04L 1/0025; H04L 5/14; H04L 1/0009; H04L 5/0023
USPC ........................................................ 370/329
See application file for complete search history.

(56) References Cited

U.S. PATENT DOCUMENTS

| 2019/0090265 A1 | 3/2019 | Zhang et al. |
| 2020/0228196 A1 | 7/2020 | John Wilson et al. |
| 2020/0236661 A1* | 7/2020 | Hassan Hussein ... H04L 5/0044 |

(Continued)

FOREIGN PATENT DOCUMENTS

WO    WO2022186816 A1    9/2022

*Primary Examiner* — Rownak Islam
(74) *Attorney, Agent, or Firm* — Kevin M. Donnelly; Holland & Hart LLP

(57) ABSTRACT

Methods, systems, and devices for wireless communication are described. A user equipment (UE) or a base station may be configured to indicate that a transmission occasion is empty while operating in a full-duplex mode. In some examples, the UE may transmit, to the base station, an indication that an uplink transmission occasion (for example, a configured grant transmission occasion) will not be used by the UE for transmitting an uplink communication. In some other examples, the base station may transmit, to the UE, an indication a downlink transmission occasion (for example, semi-persistent scheduling transmission occasion) will not be used by the base station for transmitting a downlink communication. If uplink or downlink transmission occasions are empty, the UE and the base station may each update parameters to operate in a half-duplex mode.

30 Claims, 17 Drawing Sheets

(56) References Cited

U.S. PATENT DOCUMENTS

| | | | |
|---|---|---|---|
| 2022/0029761 A1* | 1/2022 | Su | H04L 27/2613 |
| 2023/0034640 A1 | 2/2023 | Zhang et al. | |
| 2023/0189333 A1 | 6/2023 | Liu et al. | |
| 2023/0217389 A1* | 7/2023 | Zander | H04W 56/0015 370/503 |

* cited by examiner

TECHNIQUES FOR INDICATING AND UPDATING TRANSMISSION OCCASIONS

CROSS REFERENCE

The present Application for Patent is a Continuation of U.S. patent application Ser. No. 17/386,221 by ZHANG et al., entitled "TECHNIQUES FOR INDICATING AND UPDATING TRANSMISSION OCCASIONS," filed Jul. 27, 2021, assigned to the assignee hereof, and expressly incorporated by reference in its entirety herein.

TECHNICAL FIELD

The following relates to wireless communication, including techniques for indicating and updating transmission occasions.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, wireless devices (for example, base stations and UEs) may be capable of operating in a full-duplex (FD) mode. An FD mode may enable a wireless device to transmit information (such as, data packets), for example, using a first antenna panel, while concurrently receiving information, for example, using a second antenna panel. In some examples, a base station may concurrently transmit a downlink (DL) transmission and receive an uplink (UL) transmission. In some examples, the DL transmission and the UL transmission may share a time resource. For example, a UE may transmit the UL transmission to the base station and the base station may concurrently transmit the DL transmission to the UE using an overlapping time resource. In some examples, operating in the FD mode when UL or DL transmission occasions are empty (for example, if a wireless device has no data to transmit in a UL or DL transmission occasion) may unnecessarily consume time-frequency resources, increase latency, and reduce spectral efficiency, among other disadvantages.

SUMMARY

The systems, methods and devices of this disclosure each have several innovative aspects, no single one of which is solely responsible for the desirable attributes disclosed herein. One innovative aspect of the subject matter described in this disclosure can be implemented in a method for wireless communication. The method includes receiving, from a base station, control signaling identifying a first set of one or more parameters associated with semi-static communication with the base station in a full-duplex mode, transmitting, to the base station, first signaling indicating an empty uplink transmission occasion associated with the full-duplex mode, and receiving, from the base station based on transmitting the first signaling, a downlink signal in a downlink transmission occasion corresponding to the empty uplink transmission occasion according to a second set of one or more parameters associated with communication with the base station in a half-duplex mode.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to receive, from a base station, control signaling identifying a first set of one or more parameters associated with semi-static communication with the base station in a full-duplex mode, transmit, to the base station, first signaling indicating an empty uplink transmission occasion associated with the full-duplex mode, and receive, from the base station based on transmitting the first signaling, a downlink signal in a downlink transmission occasion corresponding to the empty uplink transmission occasion according to a second set of one or more parameters associated with communication with the base station in a half-duplex mode.

Another innovative aspect of the subject matter described in this disclosure can be implemented in an apparatus for wireless communication. The apparatus includes means for receiving, from a base station, control signaling identifying a first set of one or more parameters associated with semi-static communication with the base station in a full-duplex mode, means for transmitting, to the base station, first signaling indicating an empty uplink transmission occasion associated with the full-duplex mode, and means for receiving, from the base station based on transmitting the first signaling, a downlink signal in a downlink transmission occasion corresponding to the empty uplink transmission occasion according to a second set of one or more parameters associated with communication with the base station in a half-duplex mode.

Another innovative aspect of the subject matter described in this disclosure can be implemented in a non-transitory computer-readable medium storing code for wireless communication. The code includes instructions executable by a processor to receive, from a base station, control signaling identifying a first set of one or more parameters associated with semi-static communication with the base station in a full-duplex mode, transmit, to the base station, first signaling indicating an empty uplink transmission occasion associated with the full-duplex mode, and receive, from the base station based on transmitting the first signaling, a downlink signal in a downlink transmission occasion corresponding to the empty uplink transmission occasion according to a second set of one or more parameters associated with communication with the base station in a half-duplex mode.

Another innovative aspect of the subject matter described in this disclosure can be implemented in a method for wireless communication. The method includes receiving, from a base station, control signaling identifying a first set of one or more parameters associated with semi-static communication with the base station in a full-duplex mode, receiving, from the base station, first signaling indicating an empty downlink transmission occasion associated with the full-duplex mode, and transmitting, to the base station based on receiving the first signaling, an uplink signal in an uplink transmission occasion corresponding to the empty downlink transmission occasion according to a second set of one or more parameters associated with communication with the base station in a half-duplex mode.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to receive, from a base station, control signaling identifying a first set of one or more parameters associated with semi-static communication with the base station in a full-duplex mode, receive, from the base station, first signaling indicating an empty downlink transmission occasion associated with the full-duplex mode, and transmit, to the base station based on receiving the first signaling, an uplink signal in an uplink transmission occasion corresponding to the empty downlink transmission occasion according to a second set of one or more parameters associated with communication with the base station in a half-duplex mode.

Another innovative aspect of the subject matter described in this disclosure can be implemented in an apparatus for wireless communication. The apparatus includes means for receiving, from a base station, control signaling identifying a first set of one or more parameters associated with semi-static communication with the base station in a full-duplex mode, means for receiving, from the base station, first signaling indicating an empty downlink transmission occasion associated with the full-duplex mode, and means for transmitting, to the base station based on receiving the first signaling, an uplink signal in an uplink transmission occasion corresponding to the empty downlink transmission according to a second set of one or more parameters associated with communication with the base station in a half-duplex mode.

Another innovative aspect of the subject matter described in this disclosure can be implemented in a non-transitory computer-readable medium storing code for wireless communication. The code includes instructions executable by a processor to receive, from a base station, control signaling identifying a first set of one or more parameters associated with semi-static communication with the base station in a full-duplex mode, receive, from the base station, first signaling indicating an empty downlink transmission occasion associated with the full-duplex mode, and transmit, to the base station based on receiving the first signaling, an uplink signal in an uplink transmission occasion corresponding to the empty downlink transmission occasion according to a second set of one or more parameters associated with communication with the base station in a half-duplex mode.

Another innovative aspect of the subject matter described in this disclosure can be implemented in a method for wireless communication. The method includes transmitting, to a UE, control signaling identifying a first set of one or more parameters associated with semi-static communication with the UE in a full-duplex mode, receiving, from the UE, first signaling indicating an empty uplink transmission occasion associated with the full-duplex mode, and transmitting, to the UE based on receiving the first signaling, a downlink signal in a downlink transmission occasion corresponding to the empty uplink transmission occasion according to a second set of one or more parameters associated with communication with the base station in a half-duplex mode.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to transmit, to a UE, control signaling identifying a first set of one or more parameters associated with semi-static communication with the UE in a full-duplex mode, receive, from the UE, first signaling indicating an empty uplink transmission occasion associated with the full-duplex mode, and transmit, to the UE based on receiving the first signaling, a downlink signal in a downlink transmission occasion corresponding to the empty uplink transmission occasion according to a second set of one or more parameters associated with communication with the base station in a half-duplex mode.

Another innovative aspect of the subject matter described in this disclosure can be implemented in an apparatus for wireless communication. The apparatus includes means for transmitting, to a UE, control signaling identifying a first set of one or more parameters associated with semi-static communication with the UE in a full-duplex mode, means for receiving, from the UE, first signaling indicating an empty uplink transmission occasion associated with the full-duplex mode, and means for transmitting, to the UE based on receiving the first signaling, a downlink signal in a downlink transmission occasion corresponding to the empty uplink transmission occasion according to a second set of one or more parameters associated with communication with the base station in a half-duplex mode.

Another innovative aspect of the subject matter described in this disclosure can be implemented in a non-transitory computer-readable medium storing code for wireless communication. The code includes instructions executable by a processor to transmit, to a UE, control signaling identifying a first set of one or more parameters associated with semi-static communication with the UE in a full-duplex mode, receive, from the UE, first signaling indicating an empty uplink transmission occasion associated with the full-duplex mode, and transmit, to the UE based on receiving the first signaling, a downlink signal in a downlink transmission occasion corresponding to the empty uplink transmission occasion according to a second set of one or more parameters associated with communication with the base station in a half-duplex mode.

Another innovative aspect of the subject matter described in this disclosure can be implemented in a method for wireless communication. The method includes transmitting, to a UE, control signaling identifying a first set of one or more parameters associated with semi-static communication with the UE in a full-duplex mode, transmitting, to the UE, first signaling indicating an empty downlink transmission occasion associated with the full-duplex mode, and receiving, from the UE based on transmitting the first signaling, an uplink signal in an uplink transmission occasion corresponding to the empty downlink transmission occasion according to a second set of one or more parameters associated with communication with the UE in a half-duplex mode.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to transmit, to a UE, control signaling identifying a first set of one or more parameters associated with semi-static communication with the UE in a full-duplex mode, transmit, to the UE, first signaling indicating an empty downlink transmission occasion associated with the full-duplex mode, and receive, from the UE based on transmitting the first signaling, an uplink signal in an uplink transmission occasion corresponding to the empty downlink transmission occasion according to a second set of one or more parameters associated with communication with the UE in a half-duplex mode.

Another innovative aspect of the subject matter described in this disclosure can be implemented in an apparatus for wireless communication. The apparatus includes means for transmitting, to a UE, control signaling identifying a first set of one or more parameters associated with semi-static communication with the UE in a full-duplex mode, means for transmitting, to the UE, first signaling indicating an empty downlink transmission occasion associated with the full-duplex mode, and means for receiving, from the UE based on transmitting the first signaling, an uplink signal in an uplink transmission occasion corresponding to the empty downlink transmission occasion according to a second set of one or more parameters associated with communication with the UE in a half-duplex mode.

Another innovative aspect of the subject matter described in this disclosure can be implemented in a non-transitory computer-readable medium storing code for wireless communication. The code includes instructions executable by a processor to transmit, to a UE, control signaling identifying a first set of one or more parameters associated with semi-static communication with the UE in a full-duplex mode, transmit, to the UE, first signaling indicating an empty downlink transmission occasion associated with the full-duplex mode, and receive, from the UE based on transmitting the first signaling, an uplink signal in an uplink transmission occasion corresponding to the empty downlink transmission occasion according to a second set of one or more parameters associated with communication with the UE in a half-duplex mode.

DETAILED DESCRIPTION

Various aspects generally relate to techniques for indicating and updating transmission occasions, and more specifically to indicating that a transmission occasion is empty while operating in a full-duplex (FD) mode. For example, a user equipment (UE) may identify an uplink (UL) transmission occasion in which the UE has no data to transmit, or a base station may identify a downlink (DL) transmission occasion in which the base station has no data to transmit. In some examples, a UE may transmit, to a base station, an indication that a UL transmission occasion (for example, a configured grant (CG) transmission occasion) or multiple UL transmission occasions will not be used by the UE for transmitting a UL communication (such transmission occasions are referred to herein as "empty"). Similarly, in some examples, a base station may transmit, to a UE, an indication that a DL transmission occasion (for example, a semi-persistent scheduling (SPS) transmission occasion) or multiple DL transmission occasions are empty. If UL or DL transmission occasions are empty, the UE and the base station may each update communication parameters to operate in a half-duplex (HD) mode. For example, on DL transmission occasions that correspond to empty UL transmission occasions in the FD mode, the UE may receive DL communications or signaling according to the parameters of the HD mode. Similarly, on UL transmission occasions that correspond to empty DL transmission occasions in the FD mode, the UE may transmit UL communications or signaling according to the parameters of the HD mode.

Particular aspects of the subject matter described in this disclosure may be implemented to realize one or more of the following potential advantages. The techniques employed by the described communication devices (for example, base stations and UEs) may result in latency reduction, improved spectral efficiency, and more efficient resource utilization. For example, a base station and a UE may improve spectral efficiency by indicating empty CG and SPS occasions and switching to parameters for the HD mode (instead of using parameters for the FD mode), which may enable the UE to communicate with the base station with improved efficiency and efficacy.

Aspects of the disclosure are initially described in the context of wireless communications systems. Aspects of the disclosure are additionally illustrated by and described with reference to transmission schemes and process flows. Aspects of the disclosure are further illustrated by and described with reference to apparatus diagrams, system diagrams, and flowcharts that related to techniques for indicating and updating transmission occasions.

Figure 1:
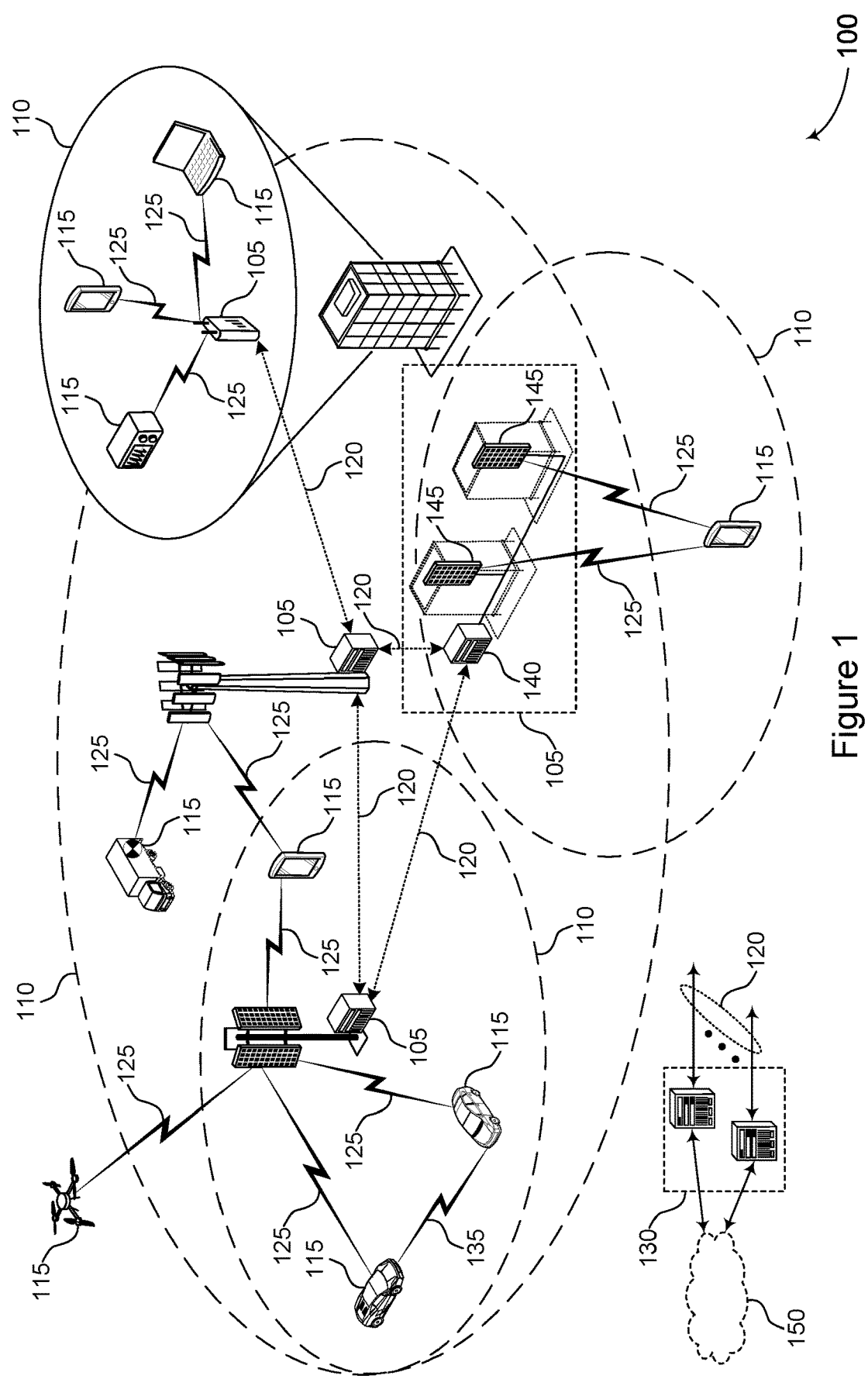
FIG. 1 illustrates an example of a wireless communications system that supports techniques for indicating and updating transmission occasions in accordance with aspects of the present disclosure.

FIG. 1 illustrates an example of a wireless communications system 100 that supports techniques for indicating and updating transmission occasions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit, which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RB s)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communication to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use one or both of error detection techniques or error correction techniques to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a base station 105 and a UE 115 operating in an FD mode if SPS or CG transmission occasions are empty may consume time-frequency resources, increase latency, and reduce spectral efficiency. Various aspects of the implementation generally relate to techniques for indicating and updating transmission occasions, and more specifically to a UE 115 or a base station 105 indicating that a transmission occasion is empty during FD communications. In some examples, a UE 115 may transmit, to a base station 105, an indication that a UL transmission occasion (for example, a CG transmission occasion) or a subset of UL transmission occasions is empty. In some other examples, a base station 105 may transmit, to a UE 105, an indication that a DL transmission occasion (for example, an SPS transmission occasion) or a subset of DL transmission occasions is empty. If UL or DL transmission occasions are empty, the UE 115 and the base station 105 may each update parameters, and operate in an HD mode.

Figure 2:
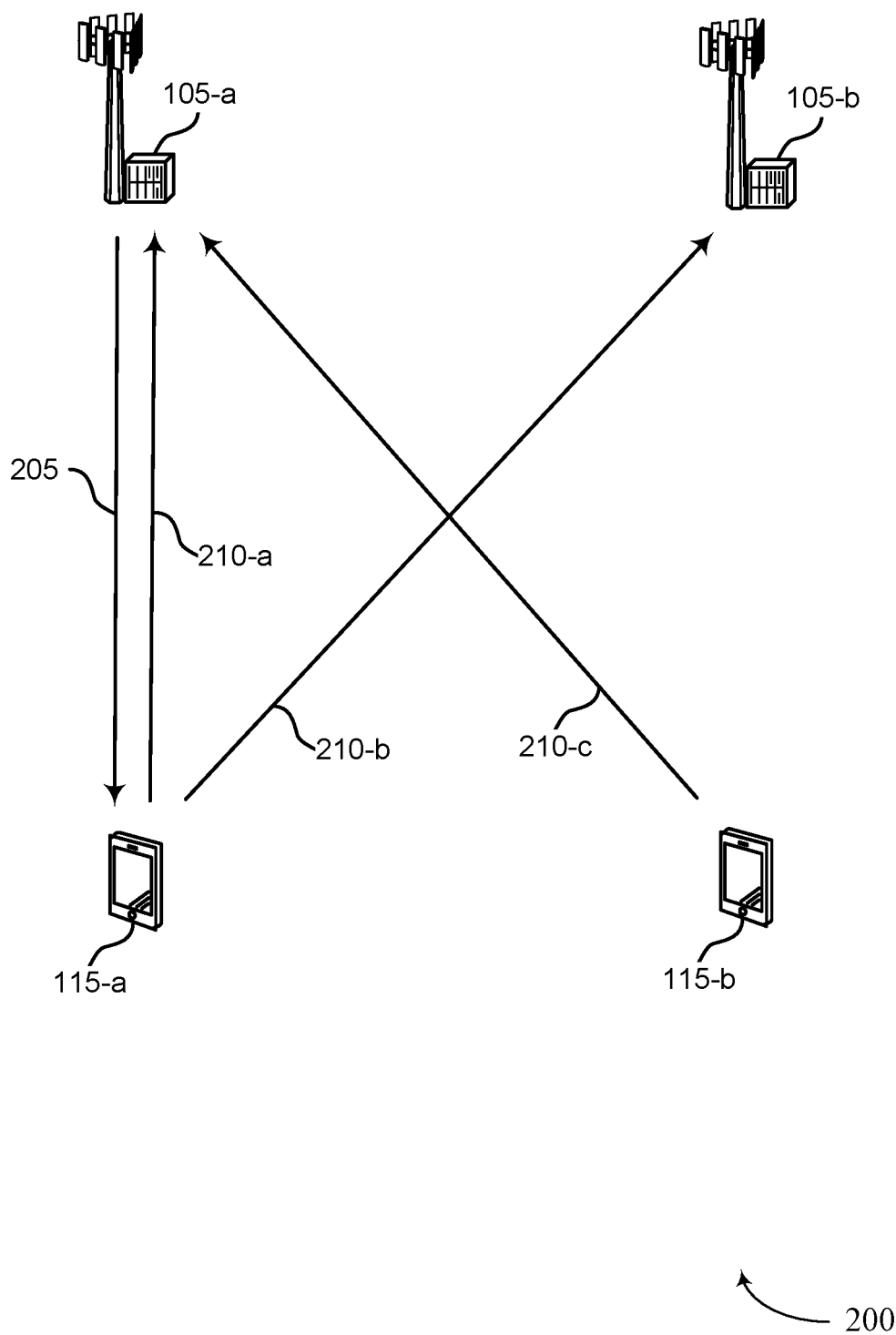
FIG. 2 illustrates an example of a wireless communications system that supports techniques for indicating and updating transmission occasions in accordance with aspects of the present disclosure.

FIG. 2 illustrates an example of a wireless communications system 200 that supports techniques for indicating and updating transmission occasions in accordance with aspects of the present disclosure. In some examples, the wireless communications system 200 may implement aspects of the wireless communications system 100. For example, the wireless communications system 200 may include one or more base stations 105 and UEs 115 (for example, vehicles, mobile devices, and additional UEs), which may be examples of corresponding base stations 105 and UEs 115 as described with reference to FIG. 1. As shown, the wireless communications system 200 may include a base station 105-a, a base station 105-b, a UE 115-a, and a UE 115-b.

In some examples, a base station 105 may operate in an FD mode, in which the base station 105 may transmit a DL transmission 205 using a first antenna panel while concurrently receiving a UL transmission 210 using a second antenna panel. For example, the base station 105-a may transmit a DL transmission 205 to the UE 115-a while concurrently receiving a UL transmission 210-c from the UE 115-b. In some examples, a UE 115 may also operate in an FD mode, in which the UE 115 may transmit a UL transmission 210 using a first antenna panel while concurrently receiving a DL transmission 205 using a second antenna panel. For example, the UE 115-a may receive the DL transmission 205 from the base station 105-a while concurrently transmitting the UL transmission 210-b to the base station 105-b. In some examples, the UE 115 and the base station 105 may apply respective parameters for operation in FD and HD modes. For example, the UE 115 or the base station 105 may switch between an FD mode and an HD mode by updating a beam pair parameter, a modulation and coding scheme (MCS), a transmit power, a precoder, a rank indicator (RI), a timing advance (TA) value, a guard band parameter, or other parameters that correspond to either the HD mode or the FD mode.

In some cases (for example, in a first use case), a UE 115, such as the UE 115-a, may be FD enabled (for example, operating in an FD mode), and communicate with multiple base stations 105 that may be FD disabled (for example, not operating in an FD mode) base stations 105. The UE 115-a may transmit a UL transmission 210-b to the base station 105-b and concurrently receive a DL transmission 205 from the base station 105-a. In some cases (for example, in a second use case), a base station 105, such as the base station 105-a, may be FD enabled and communicate with multiple UEs 115 that may be FD disabled. The base station 105-a may transmit a DL transmission 205 to the UE 115-a and may concurrently receive a UL transmission 210-c from the UE 115-b. In some cases (for example, in a third use case), a UE 115 and a base station 105, such as the UE 115-a and the base station 105-a, may both be FD enabled. The UE 115-a may transmit a UL transmission 210-a to the base station 105-a and may concurrently receive a DL transmission 205 from the base station 105-a. While the examples described herein may be described in accordance with the third use case, additional examples in accordance with the first, second, and other use cases may be implemented.

In some cases, wireless devices (for example, the base stations 105 and the UEs 115) operating in an FD mode may produce and be affected by an interference, such as a self-interference. For example, the UE 115-a may transmit, to the base station 105-a, the UL transmission 210-a. The UE 115-a may concurrently receive, from the base station 105-a, the DL transmission 205. In some cases, if the UL transmission 210-a and the DL transmission 205 are transmitted on overlapping time-frequency resources, the UL transmission 210-a may interfere with the DL transmission 205 (for example, the UL transmission 210-a may leak to receive antennas at the UE 115-a). In some cases, self-interference may increase a noise floor of a wireless device and result in inefficient utilization of allocated resources. Self-interference may impact DL traffic, UL traffic, or both. In some cases, FD capability may be conditional on beam separation (for example, separation between a beam used for the DL transmission 205 and a beam used for the UL transmission 210-a). FD capability may additionally be conditional on self-interference cancelation capabilities of a UE 115 and the extent of clutter echo (for example, self-interference caused by reflections), among other aspects.

In some cases, a base station 105 may configure transmission occasions for communicating with a UE 115 to improve resource efficiency. For example, the base station 105-a may configure DL transmission occasions according to a SPS configuration. Additionally or alternatively, a base station 105 may configure UL transmission occasions according to a CG configuration. The base station 105 may configure a set of transmission occasions with a periodicity and an offset according to an SPS configuration or a CG configuration. If operating in an FD mode, the base station 105 may configure DL and UL transmission occasions that overlap in time.

In some cases, transmission occasions (for example, SPS and CG transmission occasions) may be empty. For example, the base station 105 may configure a set of four SPS transmission occasions and may only have DL data to transmit on two of the four SPS transmission occasions. Similarly, the base station 105 may configure a set of four CG transmission occasions and the UE 115 may only have UL data to transmit on two of the four CG transmission occasions. In some cases, operating in an FD mode if SPS or CG transmission occasions are empty may consume time-frequency resources, increase latency, and reduce spectral efficiency.

In some examples, the UE 115-a may transmit, to the base station 105-a, an indication that a UL transmission occasion or a subset of UL transmission occasions is empty. Additionally or alternatively, the base station 105-*a* may transmit, to the UE 115-*a*, an indication that a DL transmission occasion or a subset of DL transmission occasions is empty. If transmission occasions are empty, the UE 115-*a* may switch to an HD mode for communicating with the base station 105-*a*. For example, for DL transmission occasions that correspond to empty UL transmission occasions in the FD mode, the UE 115-*a* may receive DL communications or signaling according to the parameters of the HD mode. Similarly, for UL transmission occasions that correspond to empty DL transmission occasions in the FD mode, the UE 115-*a* may transmit UL communications or signaling according to the parameters of the HD mode. In some examples, as discussed herein, the indication may indicate a transmission occasion or a subset of transmission occasions. Additionally or alternatively, the indication may indicate a quantity of transmission occasions within a time window or a quantity of transmission occasions starting from an indicated transmission occasion to the end of transmission occasions associated with a configuration identifier (ID). In some examples, the indicated transmission occasions may be CG occasions of a CG configuration ID. In some other examples, the indicated transmission occasions may be SPS occasions of an SPS configuration ID.

In some examples, the UE 115-*a* may transmit or receive the indication and switch to the HD mode parameters based on the indication. In some other examples, the UE 115-*a* may receive, from the base station 105-*a*, an explicit indication (for example, in a downlink control information (DCI) message) that includes or indicates the updated parameters for the HD mode. In some other examples, the UE 115-*a* may receive an indication of a switch flag from the base station 105-*a* (for example, in RRC or DCI signaling), and the UE 115-*a* may switch to the HD mode parameters based on the switch flag.

Figure 3A:
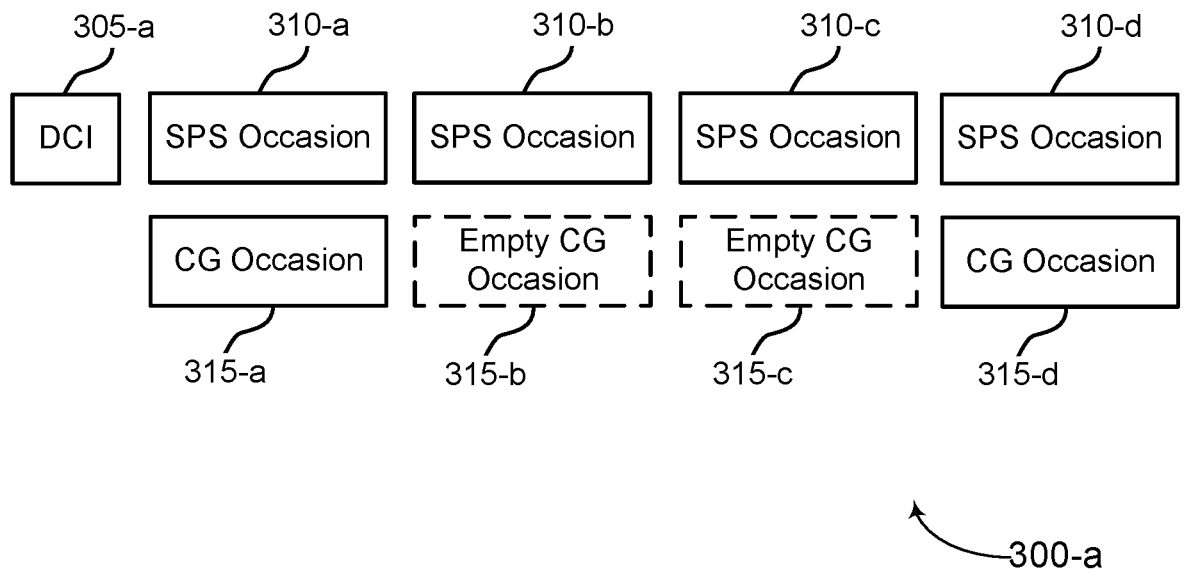
FIGS. 3A and 3B illustrate examples of transmission schemes that support techniques for indicating and updating transmission occasions in accordance with aspects of the present disclosure.
Figure 3B:
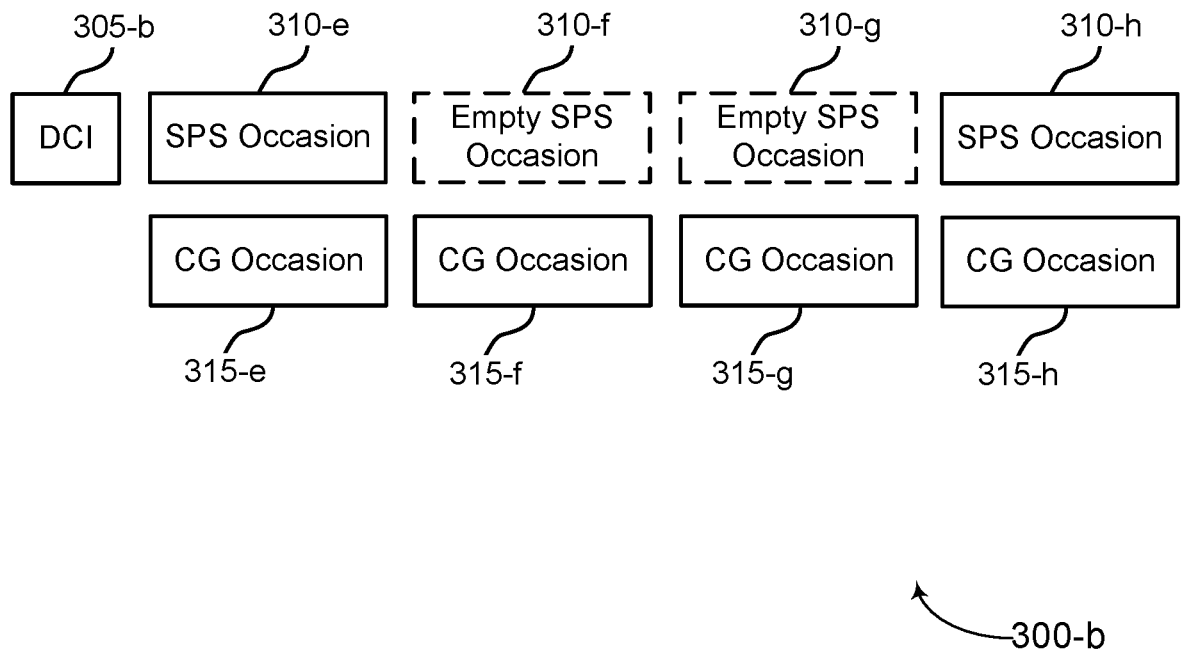

FIGS. 3A and 3B illustrate examples of transmission schemes 300 that support techniques for indicating and updating transmission occasions in accordance with aspects of the present disclosure. In some examples, the transmission schemes 300 may implement aspects of the wireless communications system 100 or the wireless communications system 200. For example, the transmission schemes 300 may illustrate communication between a base station and a UE, which may be examples of corresponding devices described with reference to FIG. 1 and FIG. 2. The transmission schemes 300 may include features for improved communication efficiency, among other benefits.

The transmission schemes 300 may include a DCI 305 and SPS occasions 310. In some examples, the SPS occasions 310 may be examples of time-frequency resources for DL transmissions from a base station to a UE. The transmission schemes 300 may also include CG occasions 315, which may be examples of time-frequency resources for UL transmissions from the base station to the UE. In some examples, the UE and the base station may communicate in an FD mode. The base station may configure SPS occasions 310 and CG occasions 315 for FD communication via the DCI 305. As illustrated in FIGS. 3A and 3B, the SPS occasions 310 may overlap with the CG occasions 315 in the FD mode. In some examples, a subset of the SPS occasions 310 and the CG occasions 315 may overlap in the FD mode, and additional SPS occasions 310 and CG occasions 315 may not overlap in an HD mode.

As illustrated in a transmission scheme 300-*a* in FIG. 3A, the UE may not have UL data to transmit on CG occasions 315-*b* and 315-*c*. The UE may transmit, to the base station, an indication that that the CG occasions 315-*b* and 315-*c* are empty. Additionally or alternatively, the indication may indicate missing data on a CG occasion 315 of a CG configuration ID, a subset of CG occasions 315 of a CG configuration ID, CG occasions 315 of the CG configuration ID within a time window, or CG occasions 315 starting from an indicated CG occasion 315 to the end of the CG configuration ID.

In some examples, the UE may switch to parameters for receiving data on SPS occasions 310-*b* and 310-*c* in an HD mode based on the SPS occasions 310-*b* and 310-*c* overlapping with the empty CG occasions 315-*b* and 315-*c*, respectively. The UE may switch to parameters and receive data on the SPS occasion 310-*b* and the SPS occasion 310-*c* in the HD mode. For example, the UE may update a beam pair parameter, an MCS, a transmit power, a precoder, an RI, a TA value, a guard band parameter, or other parameters to operate in the HD mode.

The indication of the parameter switch may be an implicit indication, an explicit indication, or a switch flag indication. In some examples, for the implicit indication, the UE may not have data to transmit and may switch to HD mode parameters (for example, HD mode parameters configured at the UE) based on transmitting the indication to the base station. In some other examples, for the explicit indication, the base station may transmit a DCI 305 to indicate updated parameters for the SPS occasions 310 that overlap with the empty CG occasions 315. For example, the base station may transmit an indication in a DCI 305-*a* indicating updated parameters for the HD mode. In some other examples, for a switch flag indication, the base station may transmit a switch flag, for example in the DCI 305-*a* or in RRC signaling. The switch flag may be a binary value. The UE may receive the switch flag and switch to HD mode parameters configured at the UE.

As illustrated in a transmission scheme 300-*b* in FIG. 3B, the base station may not have DL data to transmit on SPS occasions 310-*f* and 310-*g*. The base station may transmit, to a UE, an indication that the SPS occasions 310-*f* and 310-*g* are empty. Additionally or alternatively, the indication may indicate missing data on a SPS occasion 310 of a SPS configuration ID, a subset of SPS occasions 310 of a SPS configuration ID, SPS occasions 310 of a SPS configuration ID within a time window, or SPS occasions 310 starting from an indicated SPS occasion 310 to the end of a SPS configuration ID.

In some examples, the UE may switch to parameters for transmitting data on the CG occasions 315-*f* and 315-*g* in an HD mode based on the CG occasions 315-*f* and 315-*g* overlapping with the empty SPS occasions 310-*f* and 310-*g*, respectively. The UE may switch to parameters and transmit data on the CG occasion 315-*d* and the CG occasion 315-*e* in the HD mode. For example, the UE may update a beam pair parameter, an MCS, a transmit power, a precoder, an RI, a TA value, a guard band parameter, or other parameters to operate in the HD mode.

The indication of the parameter switch may be an implicit indication, an explicit indication, or a switch flag indication. In some examples, for the implicit indication, the UE may switch to HD mode parameters (for example, HD mode parameters configured at the UE) based on receiving the indication of the empty SPS occasions 310-*f* and 310-*g*. In some other examples, for the explicit indication, the base station may transmit a DCI 305 to indicate updated parameters for the CG occasions 315 that overlap with the empty SPS occasions 310. For example, the base station may transmit an indication in a DCI 305-*b* indicating updated parameters for the HD mode. In some other examples, for a switch flag indication, the base station may transmit a switch flag, for example in the DCI 305-*b* or in RRC signaling. The switch flag may be a binary value. The UE may receive the switch flag and switch to HD mode parameters configured at the UE.

Figure 4:
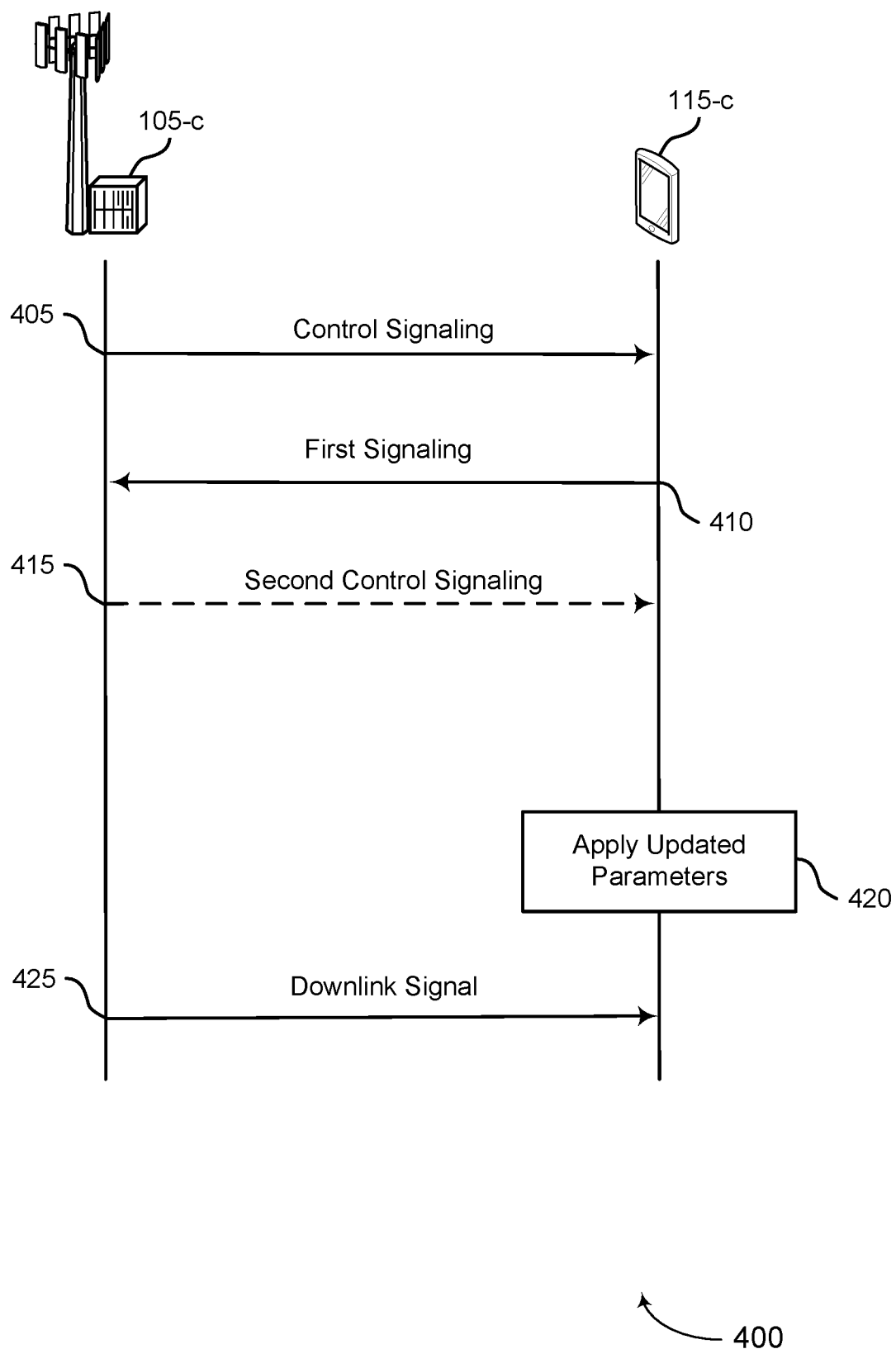
FIG. 4 illustrates an example of a process flow that supports techniques for indicating and updating transmission occasions in accordance with aspects of the present disclosure.

FIG. 4 illustrates an example of a process flow 400 that supports techniques for indicating and updating transmission occasions in accordance with aspects of the present disclosure. In some examples, the process flow 400 may implement aspects of the wireless communications systems 100 and 200. For example, the process flow 400 may include a base station 105-*c* and a UE 115-*c*, which may be examples of corresponding devices described with reference to FIGS. 1 and 2.

In the following description of the process flow 400, the operations between the base station 105-*c* and the UE 115-*c* may be transmitted in a different order than the order shown, or the operations performed by the base station 105-*c* and the UE 115-*c* may be performed at different times. Some operations may also be left out of the process flow 400, or other operations may be added to the process flow 400. While the base station 105-*c* and the UE 115-*c* are shown performing a number of the operations of the process flow 400, any wireless device may perform the operations shown.

At 405, the UE 115-*c* may receive, from the base station 105-*c*, control signaling identifying parameters for semi-static communication with the base station 105-*c* in an FD mode. In some examples, the parameters may include a first beam pair parameter, a first MCS, a first transmission power, a first precoder, a first RI, a first TA value, a first guard band parameter, or other parameters. In some examples, the parameters may be associated with the UE 115-*c* receiving DL transmissions and transmitting UL transmissions in the FD mode.

At 410, the UE 115-*c* may transmit, to the base station 105-*c*, first signaling indicating a UL transmission occasion associated with the FD mode is empty. For example, the UE 115-*c* may transmit, to the base station 105-*c*, an indication that the UL transmission occasion has no data. In some examples, the first signaling may indicate the empty UL transmission occasion by including a configuration ID associated with the UL transmission occasion. Additionally or alternatively, the first signaling may indicate a subset of transmission occasions, a quantity of transmission occasions within a time window, or a quantity of transmission occasions starting from an indicated transmission occasion to the end of a configuration ID. In some examples, the empty UL transmission occasion may be a CG occasion.

At 415, the UE 115-*c* may receive, from the base station 105-*c*, second control signaling indicating updated parameters for a DL transmission occasion (for example, an SPS occasion) corresponding to the empty UL transmission occasion in the FD mode. In some examples, the updated parameters may include a second beam pair parameter, a second MCS, a second transmission power, a second precoder, a second RI, a second TA value, or other parameters. In some examples, the updated parameters for the DL transmission occasion may be associated with an HD mode. In some examples, the second control signaling may include an indication of a switch flag associated with the HD mode. In some examples, the switch flag may indicate a parameter switch associated with a transition from the FD mode to the HD mode. In some examples, the second control signaling may include a DCI message or RRC signaling.

At 420, the UE 115-*c* may apply the updated parameters for communicating in the HD mode. In some examples, the UE 115-*c* may apply the updated parameters based on receiving the updated parameters in the second control signaling. In some examples, the updated parameters may be configured at the UE 115-*c*, and the UE 115-*c* may apply the updated parameters based on transmitting the first signaling, or based on the switch flag.

At 425, the UE 115-*c* may receive, from the base station 105-*d*, a DL signal in the DL transmission occasion. The DL signal may be received based on transmitting the first signaling and according to the updated parameters associated with communication with the base station 105-*c* in the HD mode.

Figure 5:
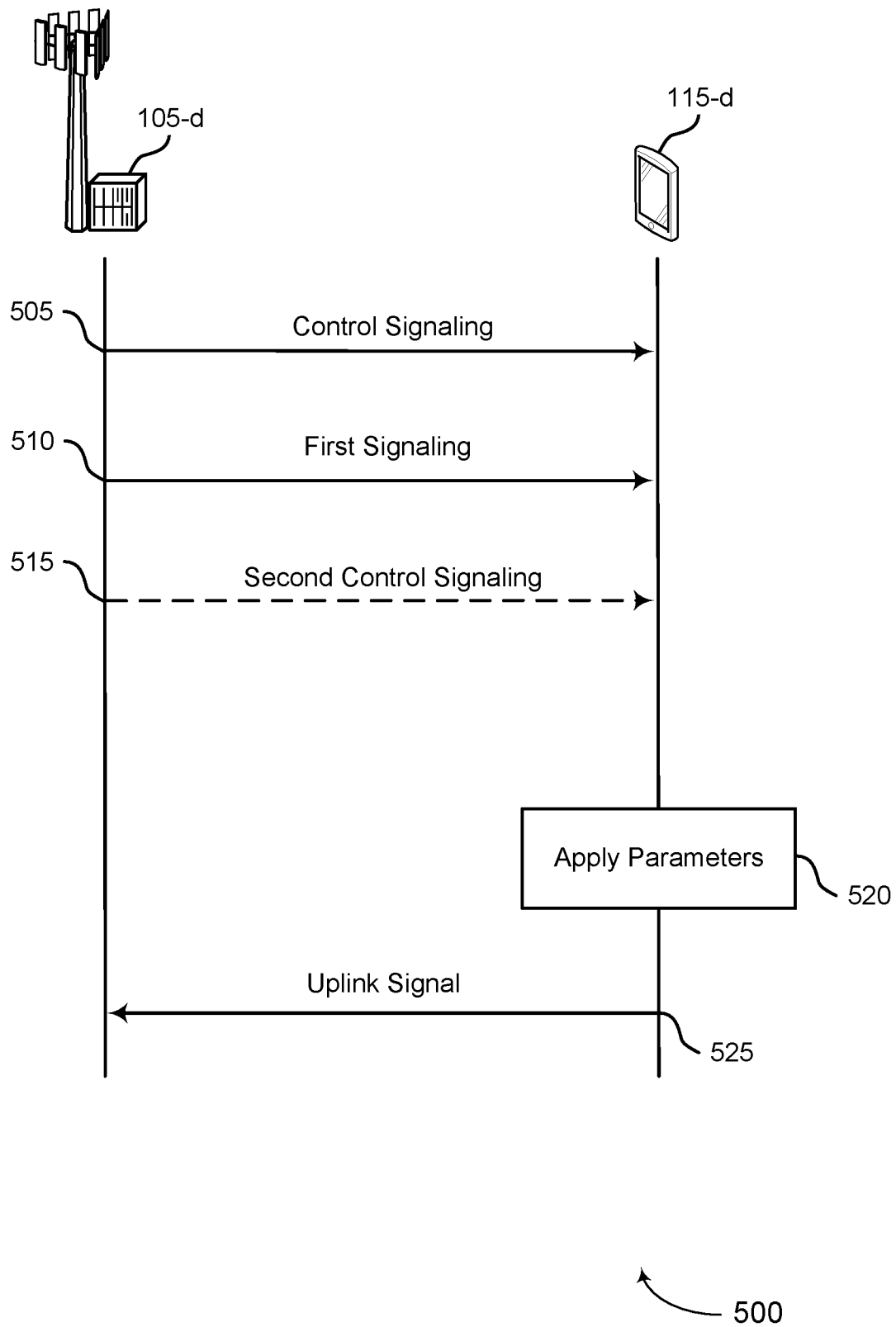
FIG. 5 illustrates an example of a process flow that supports techniques for indicating and updating transmission occasions in accordance with aspects of the present disclosure.

FIG. 5 illustrates an example of a process flow 500 that supports techniques for indicating and updating transmission occasions in accordance with aspects of the present disclosure. In some examples, the process flow 500 may implement aspects of the wireless communications systems 100 and 200. For example, the process flow 500 may include a base station 105-*d* and a UE 115-*d*, which may be examples of corresponding devices described with reference to FIGS. 1 and 2.

In the following description of the process flow 500, the operations between the base station 105-*d* and the UE 115-*d* may be transmitted in a different order than the order shown, or the operations performed by the base station 105-*d* and the UE 115-*d* may be performed at different times. Some operations may also be left out of the process flow 500, or other operations may be added to the process flow 500. While the base station 105-*d* and the UE 115-*d* are shown performing a number of the operations of the process flow 500, any wireless device may perform the operations shown.

At 505, the base station 105-*d* may transmit, to the UE 115-*d*, control signaling identifying parameters for semi-static communication with the base station 105-*d* in an FD mode. In some examples, the parameters may include a first beam pair parameter, a first MCS, a first transmission power, a first precoder, a first RI, a first TA value, a first guard band parameter, or other parameters. In some examples, the parameters may be associated with the UE 115-*d* receiving DL transmissions and transmitting UL transmissions in the FD mode.

At 510, the base station 105-*d* may transmit, to the UE 115-*d*, first signaling indicating a DL transmission occasion associated with the FD mode is empty. For example, the base station 105-*d* may transmit, to the UE 115-*d*, an indication that the DL transmission occasion has no data. In some examples, the first signaling may indicate the empty DL transmission occasion by including a configuration ID associated with the DL transmission occasion. Additionally or alternatively, the first signaling may indicate a subset of transmission occasions, a quantity of transmission occasions within a time window, or a quantity of transmission occasions starting from an indicated transmission occasion to the end of a configuration ID. In some examples, the empty DL transmission occasion may be an SPS occasion.

At 515, the base station 105-*d* may transmit, to the UE 115-*d*, second control signaling indicating updated parameters for a UL transmission occasion (for example, an CG occasion) corresponding to the empty DL transmission occasion in the FD mode. In some examples, the updated parameters may include a second beam pair parameter, a second MCS, a second transmission power, a second precoder, a second RI, a second TA value, or other parameters. In some examples, the updated parameters for the UL transmission occasion may be associated with an HD mode. In some examples, the second control signaling may include an indication of a switch flag associated with the HD mode.

In some examples, the switch flag may indicate a parameter switch associated with a transition from the FD mode to the HD mode. In some examples, the second control signaling may include a DCI message or RRC signaling.

At 520, the UE 115-*d* may apply the updated parameters for communicating in the HD mode. In some examples, the UE 115-*d* may apply the updated parameters based on receiving the updated parameters in the second control signaling. In some examples, the updated parameters may be configured at the UE 115-*d*, and the UE 115-*d* may apply the updated parameters based on transmitting the first signaling, or based on the switch flag.

At 525, the base station 105-*d* may receive, from the UE 115-*d*, a UL signal in the UL transmission occasion. The UL signal may be received based on transmitting the first signaling and according to the updated parameters associated with communication with the UE 115-*d* in the HD mode.

Figure 6:
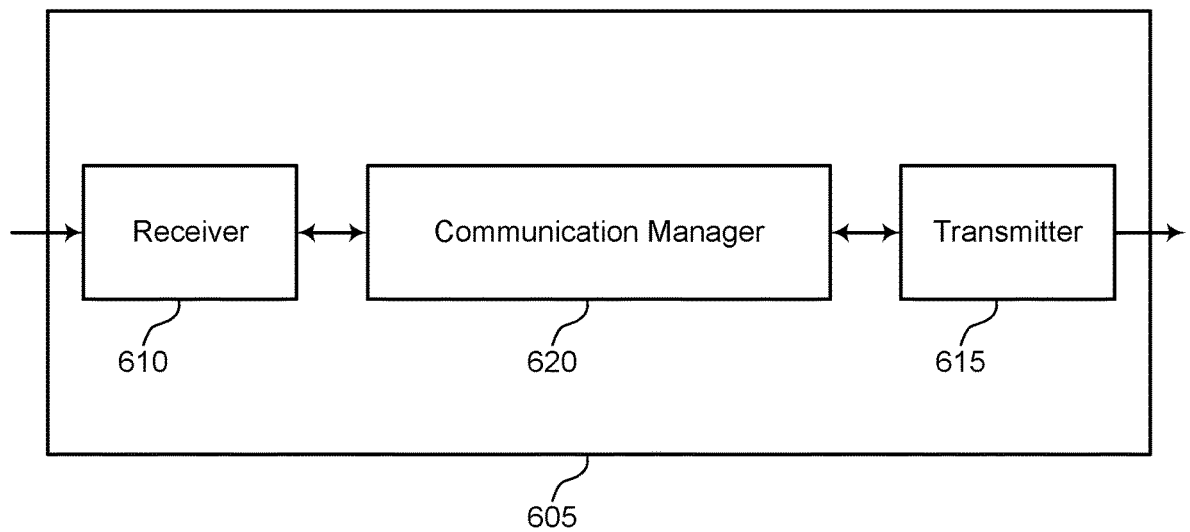
FIGS. 6 and 7 show block diagrams of devices that support techniques for indicating and updating transmission occasions in accordance with aspects of the present disclosure.

FIG. 6 shows a block diagram of a device 605 that supports techniques for indicating and updating transmission occasions in accordance with aspects of the present disclosure. The device 605 may be an example of aspects of a UE 115. The device 605 may include a receiver 610, a transmitter 615, and a communication manager 620. The communication manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to techniques for indicating and updating transmission occasions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to techniques for indicating and updating transmission occasions). In some examples, the transmitter 615 may be co-located with a receiver 610 in a transceiver component. The transmitter 615 may utilize a single antenna or a set of multiple antennas.

The communication manager 620, the receiver 610, the transmitter 615, or various combinations thereof or various components thereof may be examples of means for performing various aspects of techniques for indicating and updating transmission occasions. For example, the communication manager 620, the receiver 610, the transmitter 615, or various combinations or components thereof may support a method for performing one or more of the functions described herein.

In some examples, the communication manager 620, the receiver 610, the transmitter 615, or various combinations or components thereof may be implemented in hardware (for example, in communication management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communication manager 620, the receiver 610, the transmitter 615, or various combinations or components thereof may be implemented in code (for example, as communication management software or firmware) executed by a processor. If implemented in code executed by a processor, the functions of the communication manager 620, the receiver 610, the transmitter 615, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communication manager 620 may be configured to perform various operations (for example, receiving, monitoring, transmitting) using or otherwise in cooperation with the receiver 610, the transmitter 615, or both. For example, the communication manager 620 may receive information from the receiver 610, send information to the transmitter 615, or be integrated in combination with the receiver 610, the transmitter 615, or both to receive information, transmit information, or perform various other operations.

The communication manager 620 may support wireless communication at a UE in accordance with examples as disclosed herein. For example, the communication manager 620 may be configured as or otherwise support a means for receiving, from a base station, control signaling identifying a first set of one or more parameters associated with semi-static communication with the base station in a full-duplex mode. The communication manager 620 may be configured as or otherwise support a means for transmitting, to the base station, first signaling indicating an empty uplink transmission occasion associated with the full-duplex mode. The communication manager 620 may be configured as or otherwise support a means for receiving, from the base station based on transmitting the first signaling, a downlink signal in a downlink transmission occasion corresponding to the empty uplink transmission occasion according to a second set of one or more parameters associated with communication with the base station in a half-duplex mode.

Additionally or alternatively, the communication manager 620 may support wireless communication at a UE in accordance with examples as disclosed herein. For example, the communication manager 620 may be configured as or otherwise support a means for receiving, from a base station, control signaling identifying a first set of one or more parameters associated with semi-static communication with the base station in a full-duplex mode. The communication manager 620 may be configured as or otherwise support a means for receiving, from the base station, first signaling indicating an empty downlink transmission occasion associated with the full-duplex mode. The communication manager 620 may be configured as or otherwise support a means for transmitting, to the base station based on receiving the first signaling, an uplink signal in an uplink transmission occasion corresponding to the empty downlink transmission occasion in the full-duplex mode, the uplink signal transmitted based on receiving the first signaling and according to a second set of one or more parameters associated with communication with the base station in a half-duplex mode.

By including or configuring the communication manager 620 in accordance with examples, the device 605 (for example, a processor controlling or otherwise coupled to the receiver 610, the transmitter 615, the communication manager 620, or a combination thereof) may support techniques for latency reduction, improved spectral efficiency, and more efficient resource utilization. For example, operations performed by the device 605 may provide improvements to CG and SPS communication. The operations performed by the device 605 may additionally provide improvements to FD communication by reducing resource utilization associated with empty transmission occasions. In some other implementations, operations performed by the device 605 may also support improvements to power consumption, reliability for UL and DL communication, spectral efficiency, higher data rates, and in some examples, low latency for UL and DL communication, among other benefits.

Figure 7:
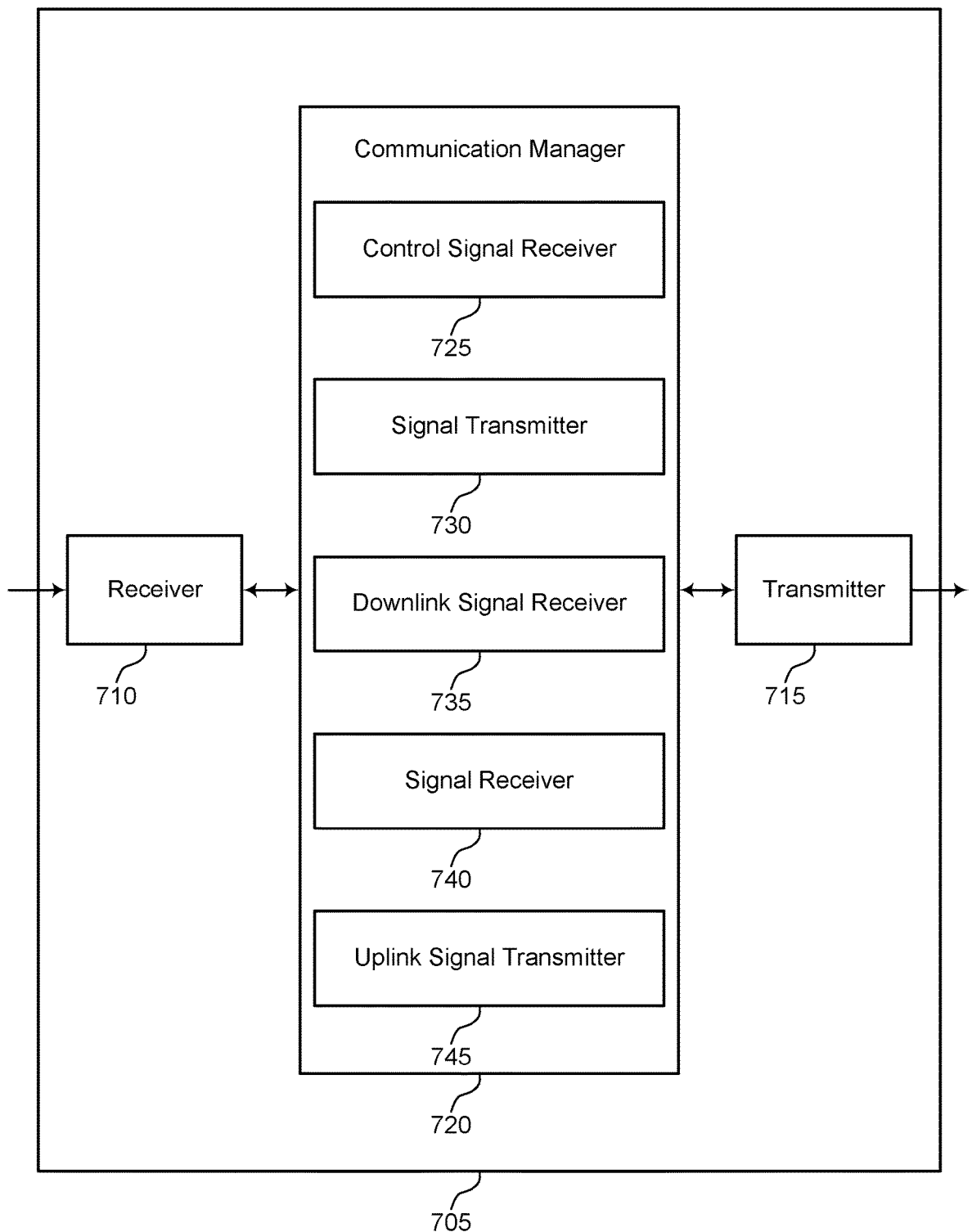

FIG. 7 shows a block diagram of a device 705 that supports techniques for indicating and updating transmission occasions in accordance with aspects of the present disclosure. The device 705 may be an example of aspects of a device 605 or a UE 115. The device 705 may include a receiver 710, a transmitter 715, and a communication manager 720. The communication manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to techniques for indicating and updating transmission occasions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to techniques for indicating and updating transmission occasions). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for indicating and updating transmission occasions. For example, the communication manager 720 may include a control signal receiver 725, a signal transmitter 730, a downlink signal receiver 735, a signal receiver 740, an uplink signal transmitter 745, or any combination thereof. In some examples, the communication manager 720, or various components thereof, may be configured to perform various operations (for example, receiving, monitoring, transmitting) using or otherwise in cooperation with the receiver 710, the transmitter 715, or both. For example, the communication manager 720 may receive information from the receiver 710, send information to the transmitter 715, or be integrated in combination with the receiver 710, the transmitter 715, or both to receive information, transmit information, or perform various other operations.

The communication manager 720 may support wireless communication at a UE in accordance with examples as disclosed herein. The control signal receiver 725 may be configured as or otherwise support a means for receiving, from a base station, control signaling identifying a first set of one or more parameters associated with semi-static communication with the base station in a full-duplex mode. The signal transmitter 730 may be configured as or otherwise support a means for transmitting, to the base station, first signaling indicating an empty uplink transmission occasion associated with the full-duplex mode. The downlink signal receiver 735 may be configured as or otherwise support a means for receiving, from the base station based on transmitting the first signaling, a downlink signal in a downlink transmission occasion corresponding to the empty uplink transmission occasion according to a second set of one or more parameters associated with communication with the base station in a half-duplex mode.

Additionally or alternatively, the communication manager 720 may support wireless communication at a UE in accordance with examples as disclosed herein. The control signal receiver 725 may be configured as or otherwise support a means for receiving, from a base station, control signaling identifying a first set of one or more parameters associated with semi-static communication with the base station in a full-duplex mode. The signal receiver 740 may be configured as or otherwise support a means for receiving, from the base station, first signaling indicating an empty downlink transmission occasion associated with the full-duplex mode. The uplink signal transmitter 745 may be configured as or otherwise support a means for transmitting, to the base station based on receiving the first signaling, an uplink signal in an uplink transmission occasion corresponding to the empty downlink transmission occasion in the full-duplex mode, the uplink signal transmitted based on receiving the first signaling and according to a second set of one or more parameters associated with communication with the base station in a half-duplex mode.

Figure 8:
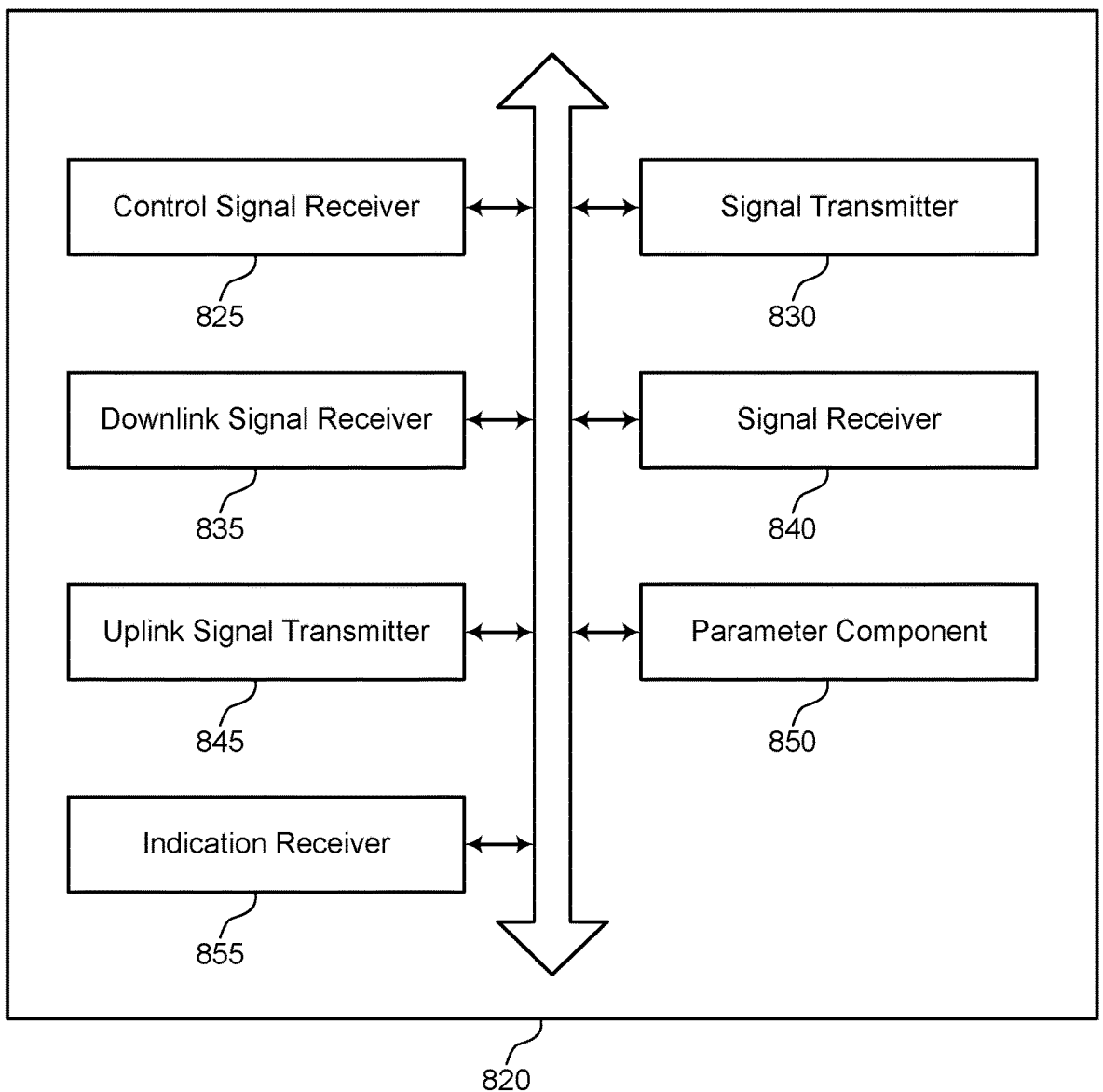
FIG. 8 shows a block diagram of a communication manager that supports techniques for indicating and updating transmission occasions in accordance with aspects of the present disclosure.

FIG. 8 shows a block diagram of a communication manager 820 that supports techniques for indicating and updating transmission occasions in accordance with aspects of the present disclosure. The communication manager 820 may be an example of aspects of a communication manager 620, a communication manager 720, or both. The communication manager 820, or various components thereof, may be an example of means for performing various aspects of techniques for indicating and updating transmission occasions. For example, the communication manager 820 may include a control signal receiver 825, a signal transmitter 830, a downlink signal receiver 835, a signal receiver 840, an uplink signal transmitter 845, a parameter component 850, an indication receiver 855, or any combination thereof. Each of these components may communicate, directly or indirectly, with one another (for example, via one or more buses).

The communication manager 820 may support wireless communication at a UE in accordance with examples as disclosed herein. The control signal receiver 825 may be configured as or otherwise support a means for receiving, from a base station, control signaling identifying a first set of one or more parameters associated with semi-static communication with the base station in a full-duplex mode. The signal transmitter 830 may be configured as or otherwise support a means for transmitting, to the base station, first signaling indicating an empty uplink transmission occasion associated with the full-duplex mode. The downlink signal receiver 835 may be configured as or otherwise support a means for receiving, from the base station based on transmitting the first signaling, a downlink signal in a downlink transmission occasion corresponding to the empty uplink transmission occasion according to a second set of one or more parameters associated with communication with the base station in a half-duplex mode.

In some examples, the parameter component 850 may be configured as or otherwise support a means for applying, at the UE, the second set of one or more parameters associated with communication with the base station in the half-duplex mode based on identifying the empty uplink transmission occasion, in which the downlink signal is received based on applying the second set of one or more parameters.

In some examples, the control signal receiver 825 may be configured as or otherwise support a means for receiving, from the base station, second control signaling indicating the second set of one or more parameters for the downlink transmission occasion, in which the downlink signal is received based on the second set of one or more parameters indicated in the second control signaling.

In some examples, the second control signaling includes a downlink control information message.

In some examples, the indication receiver 855 may be configured as or otherwise support a means for receiving, from the base station, an indication of a switch flag associated with the half-duplex mode, in which the downlink signal is received according to the second set of one or more parameters based on receiving the indication of the switch flag.

In some examples, the indication of the switch flag is received in one or more of a radio resource control message or a downlink control information message.

In some examples, the first signaling indicates the empty uplink transmission occasion based on the first signaling having a configuration identifier associated with the empty uplink transmission occasion.

In some examples, the first signaling further indicates one or more of a subset of uplink transmission occasions associated with the configuration identifier, a time window that includes uplink transmission occasions associated with the configuration identifier, or a starting uplink transmission occasion associated with the configuration identifier.

In some examples, the first signaling is transmitted based on the UE having no data to transmit in the empty uplink transmission occasion.

In some examples, the first set of one or more parameters include one or more of a first beam pair parameter, a first modulation and coding scheme, a first transmission power, a first precoder, a first rank indicator, a first timing advance value, or a first guard band parameter. In some examples, the second set of one or more parameters include one or more of a second beam pair parameter, a second modulation and coding scheme, a second transmission power, a second precoder, a second rank indicator, or a second timing advance value.

In some examples, the downlink transmission occasion includes a semi-persistent scheduling occasion. In some examples, the empty uplink transmission occasion includes a configured grant occasion.

Additionally or alternatively, the communication manager 820 may support wireless communication at a UE in accordance with examples as disclosed herein. In some examples, the control signal receiver 825 may be configured as or otherwise support a means for receiving, from a base station, control signaling identifying a first set of one or more parameters associated with semi-static communication with the base station in a full-duplex mode. The signal receiver 840 may be configured as or otherwise support a means for receiving, from the base station, first signaling indicating an empty downlink transmission occasion associated with the full-duplex mode. The uplink signal transmitter 845 may be configured as or otherwise support a means for transmitting, to the base station based on receiving the first signaling, an uplink signal in an uplink transmission occasion corresponding to the empty downlink transmission occasion in the full-duplex mode, the uplink signal transmitted based on receiving the first signaling and according to a second set of one or more parameters associated with communication with the base station in a half-duplex mode.

In some examples, the parameter component 850 may be configured as or otherwise support a means for applying, at the UE, the second set of one or more parameters associated with communication with the base station in the half-duplex mode based on receiving the first signaling indicating the empty downlink transmission occasion, in which the uplink signal is transmitted based on applying the second set of one or more parameters.

In some examples, the control signal receiver 825 may be configured as or otherwise support a means for receiving, from the base station, second control signaling indicating the second set of one or more parameters for the uplink transmission occasion, in which the uplink signal is transmitted based on the second set of one or more parameters indicated in the second control signaling.

In some examples, the second control signaling includes a downlink control information message.

In some examples, the indication receiver 855 may be configured as or otherwise support a means for receiving, from the base station, an indication of a switch flag associated with the half-duplex mode, in which the uplink signal is transmitted according to the second set of one or more parameters based on receiving the indication of the switch flag.

In some examples, the indication of the switch flag is received in one or more of a radio resource control message or a downlink control information message.

In some examples, the first signaling indicates the empty downlink transmission occasion based on the first signaling having a configuration identifier associated with the empty downlink transmission occasion.

In some examples, the first signaling further indicates one or more of a subset of downlink transmission occasions associated with the configuration identifier, a time window that includes downlink transmission occasions associated with the configuration identifier, or a starting downlink transmission occasion associated with the configuration identifier.

In some examples, the first set of one or more parameters include one or more of a first beam pair parameter, a first modulation and coding scheme, a first transmission power, a first precoder, a first rank indicator, a first timing advance value, or a first guard band parameter. In some examples, the second set of one or more parameters include one or more of a second beam pair parameter, a second modulation and coding scheme, a second transmission power, a second precoder, a second rank indicator, or a second timing advance value.

In some examples, the empty downlink transmission occasion includes a semi-persistent scheduling occasion. In some examples, the uplink transmission occasion includes a configured grant occasion.

Figure 9:
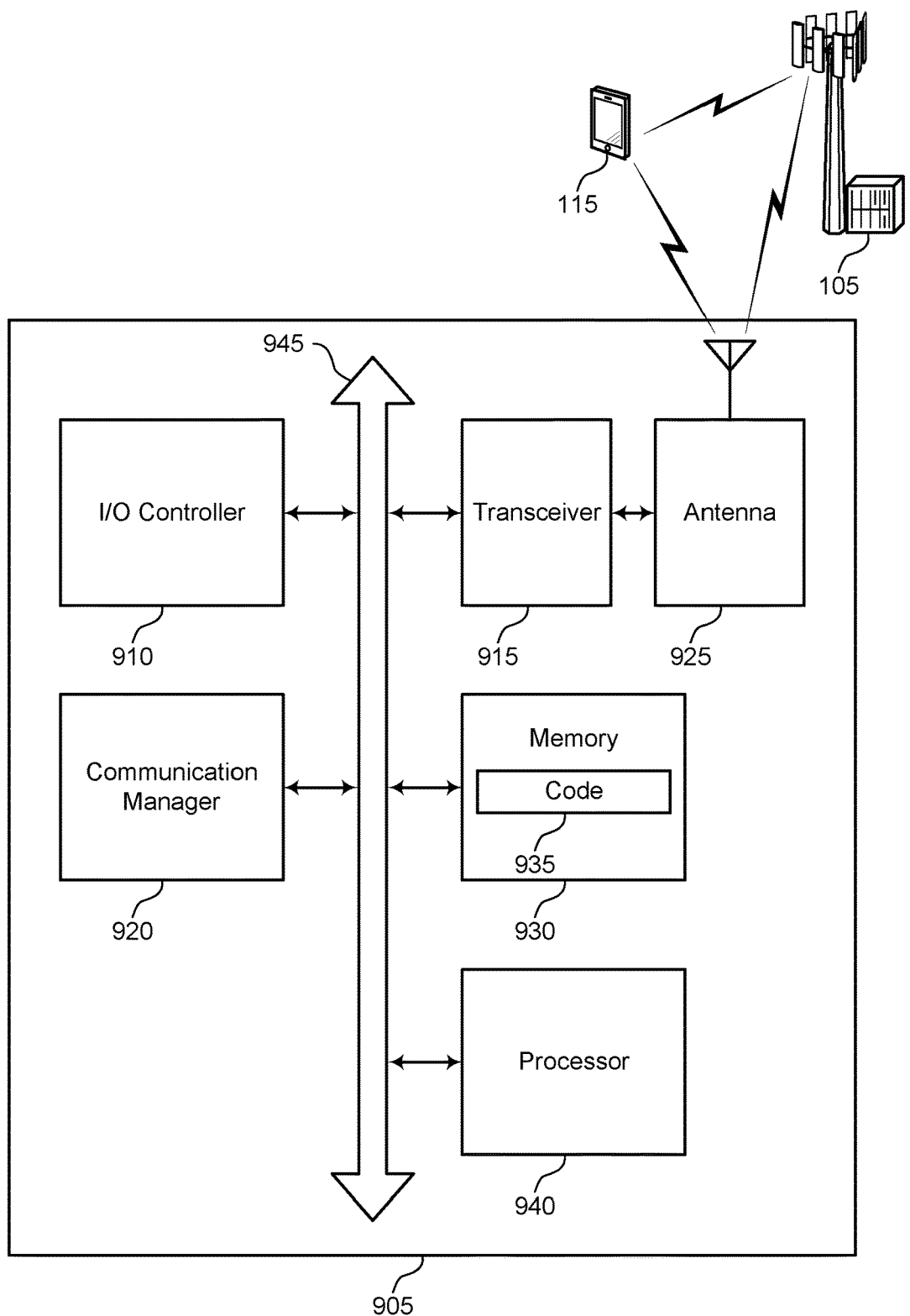
FIG. 9 shows a diagram of a system including a device that supports techniques for indicating and updating transmission occasions in accordance with aspects of the present disclosure.

FIG. 9 shows a diagram of a system 900 including a device 905 that supports techniques for indicating and updating transmission occasions in accordance with aspects of the present disclosure. The device 905 may be an example of or include the components of a device 605, a device 705, or a UE 115. The device 905 may communicate wirelessly with one or more base stations 105, UEs 115, or any combination thereof. The device 905 may include components for bi-directional voice and data communication including components for transmitting and receiving communication, such as a communication manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (for example, when compiled and executed) to perform functions described herein. In some cases, the memory 930 may contain, among other things, a basic I/O system (BIOS), which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting techniques for indicating and updating transmission occasions). For example, the device 905 or a component of the device 905 may include a processor 940 and memory 930 coupled to the processor 940, the processor 940 and memory 930 configured to perform various functions described herein.

The communication manager 920 may support wireless communication at a UE in accordance with examples as disclosed herein. For example, the communication manager 920 may be configured as or otherwise support a means for receiving, from a base station, control signaling identifying a first set of one or more parameters associated with semi-static communication with the base station in a full-duplex mode. The communication manager 920 may be configured as or otherwise support a means for transmitting, to the base station, first signaling indicating an empty uplink transmission occasion associated with the full-duplex mode. The communication manager 920 may be configured as or otherwise support a means for receiving, from the base station based on transmitting the first signaling, a downlink signal in a downlink transmission occasion corresponding to the empty uplink transmission occasion according to a second set of one or more parameters associated with communication with the base station in a half-duplex mode.

Additionally or alternatively, the communication manager 920 may support wireless communication at a UE in accordance with examples as disclosed herein. For example, the communication manager 920 may be configured as or otherwise support a means for receiving, from a base station, control signaling identifying a first set of one or more parameters associated with semi-static communication with the base station in a full-duplex mode. The communication manager 920 may be configured as or otherwise support a means for receiving, from the base station, first signaling indicating an empty downlink transmission occasion associated with the full-duplex mode. The communication manager 920 may be configured as or otherwise support a means for transmitting, to the base station based on receiving the first signaling, an uplink signal in an uplink transmission occasion corresponding to the empty downlink transmission occasion in the full-duplex mode, the uplink signal transmitted based on receiving the first signaling and according to a second set of one or more parameters associated with communication with the base station in a half-duplex mode.

By including or configuring the communication manager 920 in accordance with examples, the device 905 may support techniques for latency reduction, improved spectral efficiency, and more efficient resource utilization. For example, operations performed by the device 905 may provide improvements to CG and SPS communication. The operations performed by the device 905 may additionally provide improvements to FD communication by reducing resource utilization associated with empty transmission occasions. In some other implementations, operations performed by the device 905 may also support improvements to power consumption, reliability for UL and DL communication, spectral efficiency, higher data rates, and in some examples, low latency for UL and DL communication, among other benefits.

In some examples, the communication manager 920 may be configured to perform various operations (for example, receiving, monitoring, transmitting) using or otherwise in cooperation with the transceiver 915, the one or more antennas 925, or any combination thereof. Although the communication manager 920 is illustrated as a separate component, in some examples, one or more functions described with reference to the communication manager 920 may be supported by or performed by the processor 940, the memory 930, the code 935, or any combination thereof. For example, the code 935 may include instructions executable by the processor 940 to cause the device 905 to perform various aspects of techniques for indicating and updating transmission occasions, or the processor 940 and the memory 930 may be otherwise configured to perform or support such operations.

Figure 10:
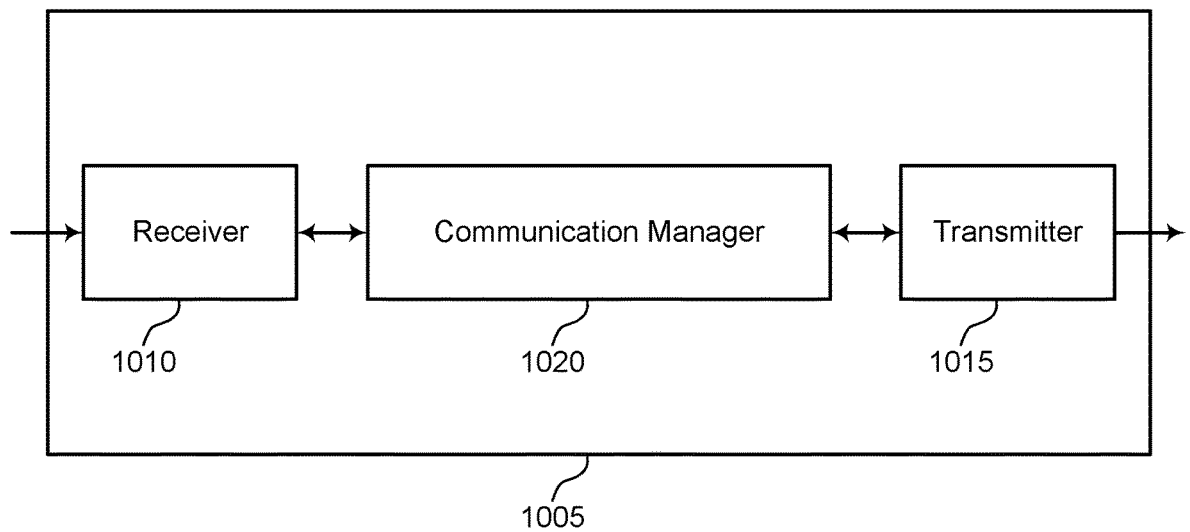
FIGS. 10 and 11 show block diagrams of devices that support techniques for indicating and updating transmission occasions in accordance with aspects of the present disclosure.

FIG. 10 shows a block diagram of a device 1005 that supports techniques for indicating and updating transmission occasions in accordance with aspects of the present disclosure. The device 1005 may be an example of aspects of a base station 105. The device 1005 may include a receiver 1010, a transmitter 1015, and a communication manager 1020. The communication manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to techniques for indicating and updating transmission occasions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to techniques for indicating and updating transmission occasions). In some examples, the transmitter 1015 may be co-located with a receiver 1010 in a transceiver component. The transmitter 1015 may utilize a single antenna or a set of multiple antennas.

The communication manager 1020, the receiver 1010, the transmitter 1015, or various combinations thereof or various components thereof may be examples of means for performing various aspects of techniques for indicating and updating transmission occasions. For example, the communication manager 1020, the receiver 1010, the transmitter 1015, or various combinations or components thereof may support a method for performing one or more of the functions described herein.

In some examples, the communication manager 1020, the receiver 1010, the transmitter 1015, or various combinations or components thereof may be implemented in hardware (for example, in communication management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communication manager 1020, the receiver 1010, the transmitter 1015, or various combinations or components thereof may be implemented in code (for example, as communication management software or firmware) executed by a processor. If implemented in code executed by a processor, the functions of the communication manager 1020, the receiver 1010, the transmitter 1015, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communication manager 1020 may be configured to perform various operations (for example, receiving, monitoring, transmitting) using or otherwise in cooperation with the receiver 1010, the transmitter 1015, or both. For example, the communication manager 1020 may receive information from the receiver 1010, send information to the transmitter 1015, or be integrated in combination with the receiver 1010, the transmitter 1015, or both to receive information, transmit information, or perform various other operations.

The communication manager 1020 may support wireless communication at a base station in accordance with examples as disclosed herein. For example, the communication manager 1020 may be configured as or otherwise support a means for transmitting, to a UE, control signaling identifying a first set of one or more parameters associated with semi-static communication with the UE in a full-duplex mode. The communication manager 1020 may be configured as or otherwise support a means for receiving, from the UE, first signaling indicating an empty uplink transmission occasion associated with the full-duplex mode. The communication manager 1020 may be configured as or otherwise support a means for transmitting, to the UE based on receiving the first signaling, a downlink signal in a downlink transmission occasion corresponding to the empty uplink transmission occasion according to a second set of one or more parameters associated with communication with the base station in a half-duplex mode.

Additionally or alternatively, the communication manager 1020 may support wireless communication at a base station in accordance with examples as disclosed herein. For example, the communication manager 1020 may be configured as or otherwise support a means for transmitting, to a UE, control signaling identifying a first set of one or more parameters associated with semi-static communication with the UE in a full-duplex mode. The communication manager 1020 may be configured as or otherwise support a means for transmitting, to the UE, first signaling indicating an empty downlink transmission occasion associated with the full-duplex mode. The communication manager 1020 may be configured as or otherwise support a means for receiving, from the UE based on transmitting the first signaling, an uplink signal in an uplink transmission occasion corresponding to the empty downlink transmission occasion in the full-duplex mode, the uplink signal received based on transmitting the first signaling and according to a second set of one or more parameters associated with communication with the UE in a half-duplex mode.

By including or configuring the communication manager 1020 in accordance with examples, the device 1005 (for example, a processor controlling or otherwise coupled to the receiver 1010, the transmitter 1015, the communication manager 1020, or a combination thereof) may support techniques for latency reduction, improved spectral efficiency, and more efficient resource utilization. For example, operations performed by the device 1005 may provide improvements to CG and SPS communication. The operations performed by the device 1005 may additionally provide improvements to FD communication by reducing resource utilization associated with empty transmission occasions. In some other implementations, operations performed by the device 1005 may also support improvements to power consumption, reliability for UL and DL communication, spectral efficiency, higher data rates, and in some examples, low latency for UL and DL communication, among other benefits.

Figure 11:
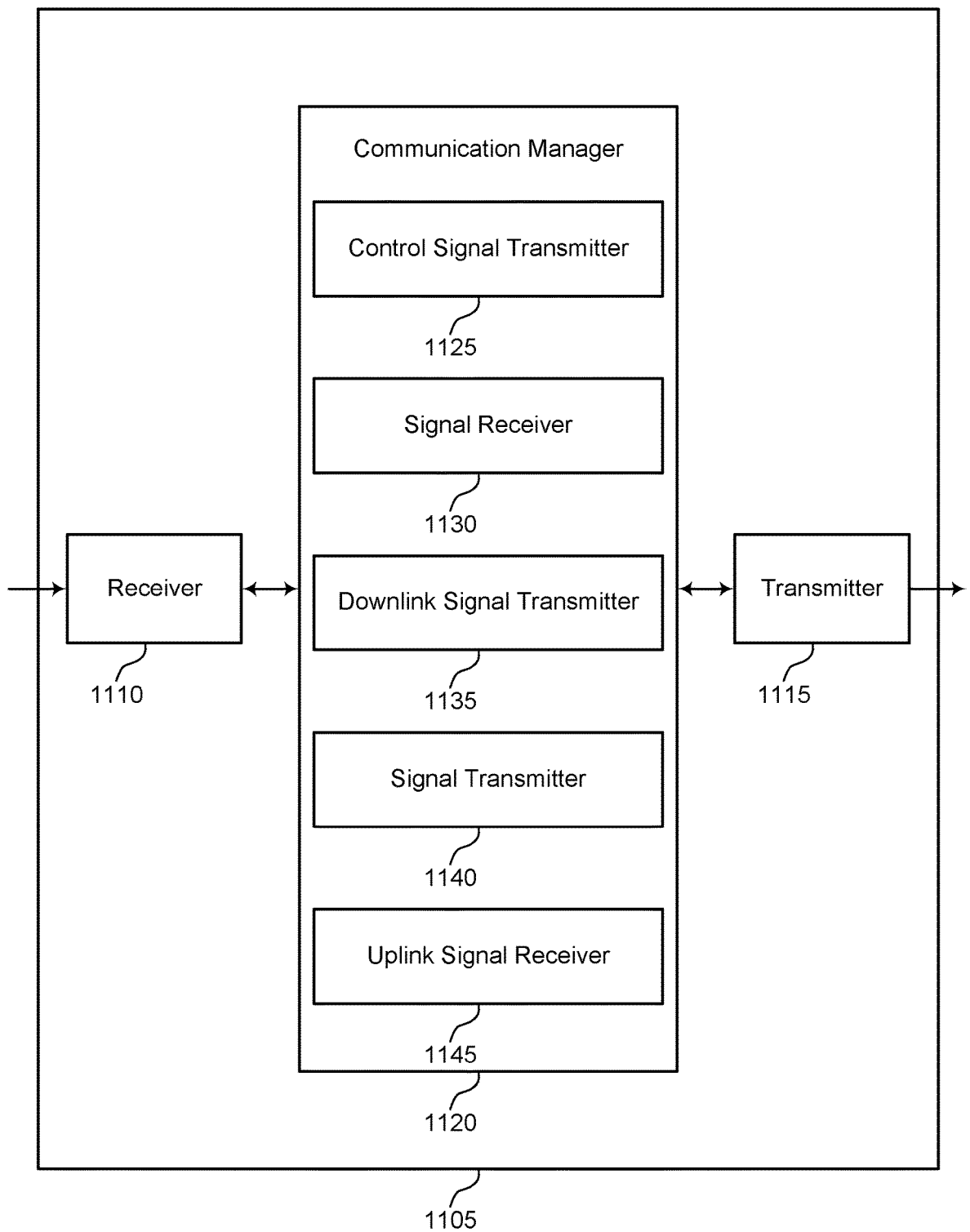

FIG. 11 shows a block diagram of a device 1105 that supports techniques for indicating and updating transmission occasions in accordance with aspects of the present disclosure. The device 1105 may be an example of aspects of a device 1005 or a base station 105. The device 1105 may include a receiver 1110, a transmitter 1115, and a communication manager 1120. The communication manager 1120 can be implemented, at least in part, by one or both of a modem and a processor. Each of these components may be in communication with one another (for example, via one or more buses).

The receiver 1110 may provide a means for receiving information such as packets, user data, control information, or any combination thereof associated with various information channels (for example, control channels, data channels, information channels related to techniques for indicating and updating transmission occasions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (for example, control channels, data channels, information channels related to techniques for indicating and updating transmission occasions). In some examples, the transmitter 1115 may be co-located with a receiver 1110 in a transceiver component. The transmitter 1115 may utilize a single antenna or a set of multiple antennas.

The device 1105, or various components thereof, may be an example of means for performing various aspects of techniques for indicating and updating transmission occasions. For example, the communication manager 1120 may include a control signal transmitter 1125, a signal receiver 1130, a downlink signal transmitter 1135, a signal transmitter 1140, an uplink signal receiver 1145, or any combination thereof. In some examples, the communication manager 1120, or various components thereof, may be configured to perform various operations (for example, receiving, monitoring, transmitting) using or otherwise in cooperation with the receiver 1110, the transmitter 1115, or both. For example, the communication manager 1120 may receive information from the receiver 1110, send information to the transmitter 1115, or be integrated in combination with the receiver 1110, the transmitter 1115, or both to receive information, transmit information, or perform various other operations.

The communication manager 1120 may support wireless communication at a base station in accordance with examples as disclosed herein. The control signal transmitter 1125 may be configured as or otherwise support a means for transmitting, to a UE, control signaling identifying a first set of one or more parameters associated with semi-static communication with the UE in a full-duplex mode. The signal receiver 1130 may be configured as or otherwise support a means for receiving, from the UE, first signaling indicating an empty uplink transmission occasion associated with the full-duplex mode. The downlink signal transmitter 1135 may be configured as or otherwise support a means for transmitting, to the UE based on receiving the first signaling, a downlink signal in a downlink transmission occasion corresponding to the empty uplink transmission occasion according to a second set of one or more parameters associated with communication with the base station in a half-duplex mode.

Additionally or alternatively, the communication manager 1120 may support wireless communication at a base station in accordance with examples as disclosed herein. The control signal transmitter 1125 may be configured as or otherwise support a means for transmitting, to a UE, control signaling identifying a first set of one or more parameters associated with semi-static communication with the UE in a full-duplex mode. The signal transmitter 1140 may be configured as or otherwise support a means for transmitting, to the UE, first signaling indicating an empty downlink transmission occasion associated with the full-duplex mode. The uplink signal receiver 1145 may be configured as or otherwise support a means for receiving, from the UE based on transmitting the first signaling, an uplink signal in an uplink transmission occasion corresponding to the empty downlink transmission occasion in the full-duplex mode, the uplink signal received based on transmitting the first signaling and according to a second set of one or more parameters associated with communication with the UE in a half-duplex mode.

Figure 12:
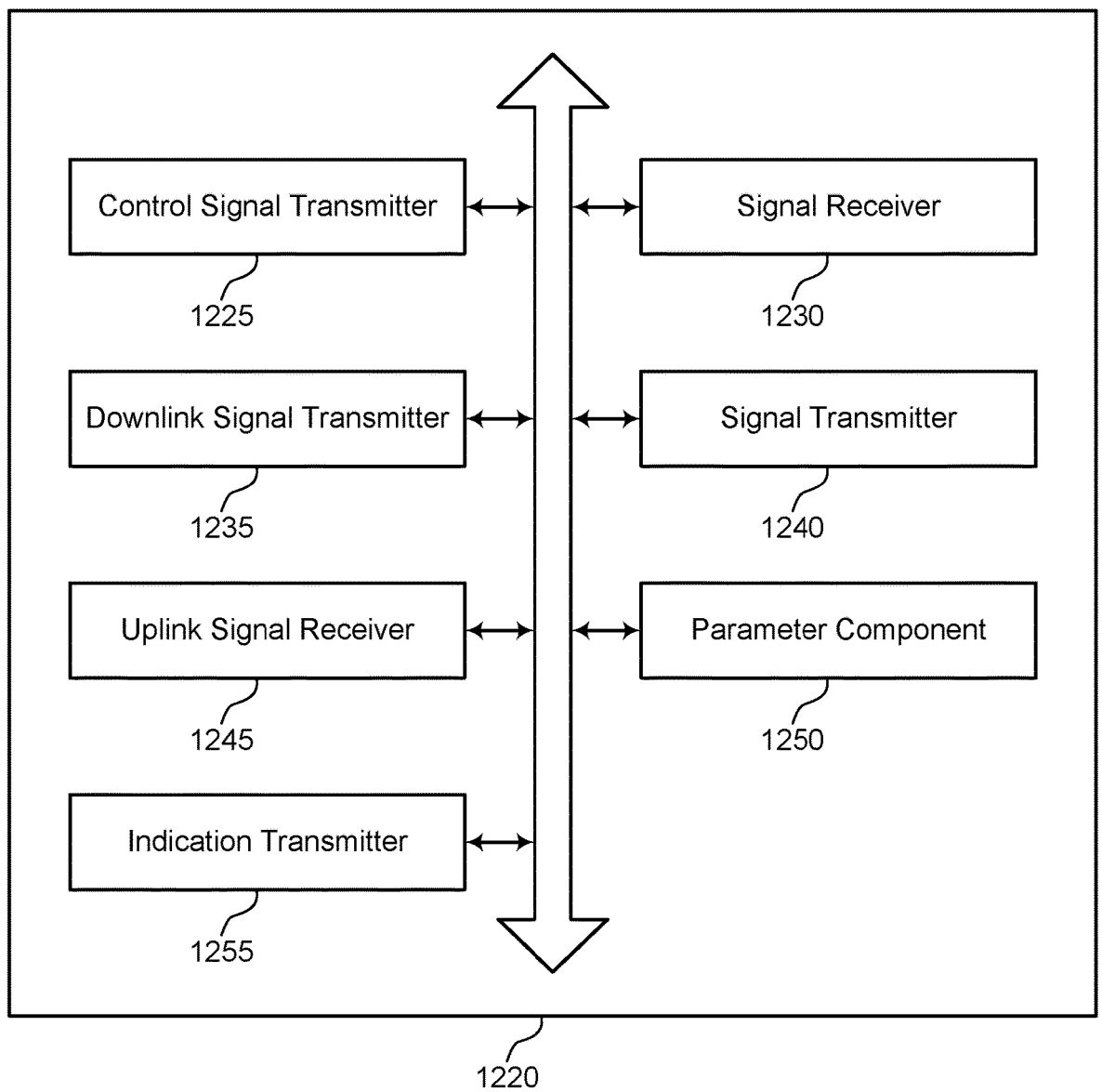
FIG. 12 shows a block diagram of a communication manager that supports techniques for indicating and updating transmission occasions in accordance with aspects of the present disclosure.

FIG. 12 shows a block diagram of a communication manager 1220 that supports techniques for indicating and updating transmission occasions in accordance with aspects of the present disclosure. The communication manager 1220 may be an example of aspects of a communication manager 1020, a communication manager 1120, or both. The communication manager 1220, or various components thereof, may be an example of means for performing various aspects of techniques for indicating and updating transmission occasions. For example, the communication manager 1220 may include a control signal transmitter 1225, a signal receiver 1230, a downlink signal transmitter 1235, a signal transmitter 1240, an uplink signal receiver 1245, a parameter component 1250, an indication transmitter 1255, or any combination thereof. Each of these components may communicate, directly or indirectly, with one another (for example, via one or more buses).

The communication manager 1220 may support wireless communication at a base station in accordance with examples as disclosed herein. The control signal transmitter 1225 may be configured as or otherwise support a means for transmitting, to a UE, control signaling identifying a first set of one or more parameters associated with semi-static communication with the UE in a full-duplex mode. The signal receiver 1230 may be configured as or otherwise support a means for receiving, from the UE, first signaling indicating an empty uplink transmission occasion associated with the full-duplex mode. The downlink signal transmitter 1235 may be configured as or otherwise support a means for transmitting, to the UE based on receiving the first signaling, a downlink signal in a downlink transmission occasion corresponding to the empty uplink transmission occasion according to a second set of one or more parameters associated with communication with the base station in a half-duplex mode.

In some examples, the parameter component 1250 may be configured as or otherwise support a means for applying, at the base station, the second set of one or more parameters associated with communication with the UE in the half-duplex mode based on receiving the first signaling indicating the empty uplink transmission occasion, in which the downlink signal is transmitted based on applying the second set of one or more parameters.

In some examples, the control signal transmitter 1225 may be configured as or otherwise support a means for transmitting, to the UE, second control signaling indicating the second set of one or more parameters for the downlink transmission occasion, in which the downlink signal is transmitted based on the second set of one or more parameters indicated in the second control signaling.

In some examples, the second control signaling includes a downlink control information message.

In some examples, the indication transmitter 1255 may be configured as or otherwise support a means for transmitting, to the UE, an indication of a switch flag associated with the half-duplex mode, in which the downlink signal is transmitted according to the second set of one or more parameters based on transmitting the indication of the switch flag.

In some examples, the indication of the switch flag is transmitted in one or more of a radio resource control message or a downlink control information message.

In some examples, the first signaling indicates the empty uplink transmission occasion based on the first signaling having a configuration identifier associated with the empty uplink transmission occasion.

In some examples, the first signaling further indicates one or more of a subset of uplink transmission occasions associated with the configuration identifier, a time window that includes uplink transmission occasions associated with the configuration identifier, or a starting uplink transmission occasion associated with the configuration identifier.

In some examples, the first set of one or more parameters include one or more of a first beam pair parameter, a first modulation and coding scheme, a first transmission power, a first precoder, a first rank indicator, a first timing advance value, or a first guard band parameter. In some examples, the second set of one or more parameters include one or more of a second beam pair parameter, a second modulation and coding scheme, a second transmission power, a second precoder, a second rank indicator, or a second timing advance value.

In some examples, the downlink transmission occasion includes a semi-persistent scheduling occasion. In some examples, the empty uplink transmission occasion includes a configured grant occasion.

Additionally or alternatively, the communication manager 1220 may support wireless communication at a base station in accordance with examples as disclosed herein. In some examples, the control signal transmitter 1225 may be configured as or otherwise support a means for transmitting, to a UE, control signaling identifying a first set of one or more parameters associated with semi-static communication with the UE in a full-duplex mode. The signal transmitter 1240 may be configured as or otherwise support a means for transmitting, to the UE, first signaling indicating an empty downlink transmission occasion associated with the full-duplex mode. The uplink signal receiver 1245 may be configured as or otherwise support a means for receiving, from the UE based on transmitting the first signaling, an uplink signal in an uplink transmission occasion corresponding to the empty downlink transmission occasion in the full-duplex mode, the uplink signal received based on transmitting the first signaling and according to a second set of one or more parameters associated with communication with the UE in a half-duplex mode.

In some examples, the parameter component 1250 may be configured as or otherwise support a means for applying, at the base station, the second set of one or more parameters associated with communication with the UE in the half-duplex mode based on identifying the empty downlink transmission occasion, in which the uplink signal is received based on applying the second set of one or more parameters.

In some examples, the control signal transmitter 1225 may be configured as or otherwise support a means for transmitting, to the UE, second control signaling indicating the second set of one or more parameters for the uplink transmission occasion, in which the uplink signal is received based on the second set of one or more parameters indicated in the second control signaling.

In some examples, the second control signaling includes a downlink control information message.

In some examples, the indication transmitter 1255 may be configured as or otherwise support a means for transmitting, to the UE, an indication of a switch flag associated with the half-duplex mode, in which the uplink signal is received according to the second set of one or more parameters based on transmitting the indication of the switch flag.

In some examples, the indication of the switch flag is transmitted in one or more of a radio resource control message or a downlink control information message.

In some examples, the first signaling indicates the empty downlink transmission occasion based on the first signaling having a configuration identifier associated with the empty downlink transmission occasion.

In some examples, the first signaling further indicates one or more of a subset of downlink transmission occasions associated with the configuration identifier, a time window that includes downlink transmission occasions associated with the configuration identifier, or a starting downlink transmission occasion associated with the configuration identifier.

In some examples, the first signaling is transmitted based on the base station having no data to transmit in the empty downlink transmission occasion.

In some examples, the first set of one or more parameters include one or more of a first beam pair parameter, a first modulation and coding scheme, a first transmission power, a first precoder, a first rank indicator, a first timing advance value, or a first guard band parameter. In some examples, the second set of one or more parameters include one or more of a second beam pair parameter, a second modulation and coding scheme, a second transmission power, a second precoder, a second rank indicator, or a second timing advance value.

In some examples, the empty downlink transmission occasion includes a semi-persistent scheduling occasion. In some examples, the uplink transmission occasion includes a configured grant occasion.

Figure 13:
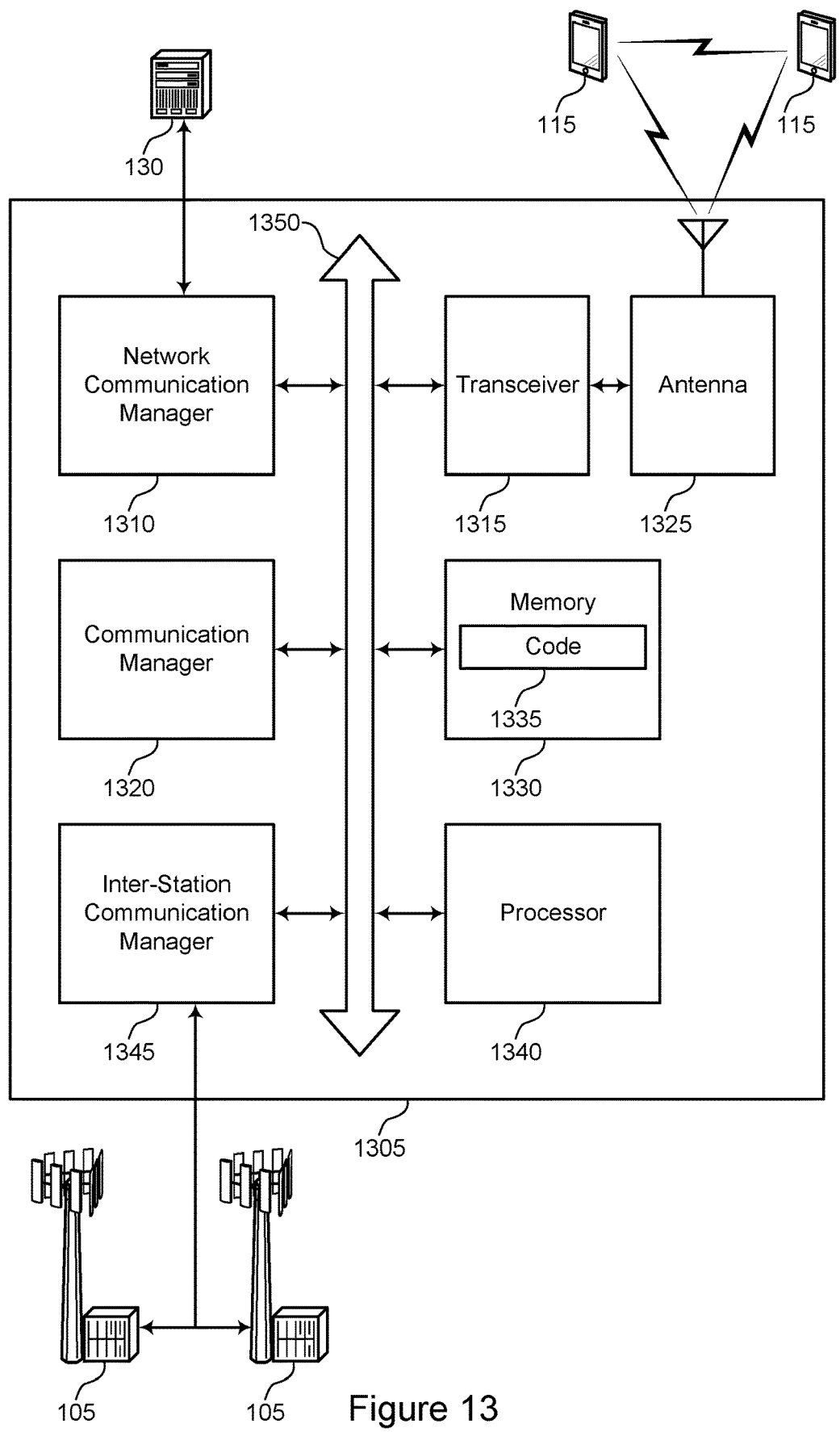
FIG. 13 shows a diagram of a system including a device that supports techniques for indicating and updating transmission occasions in accordance with aspects of the present disclosure.

FIG. 13 shows a diagram of a system 1300 including a device 1305 that supports techniques for indicating and updating transmission occasions in accordance with aspects of the present disclosure. The device 1305 may be an example of or include the components of a device 1005, a device 1105, or a base station 105. The device 1305 may communicate wirelessly with one or more base stations 105, UEs 115, or any combination thereof. The device 1305 may include components for bi-directional voice and data communication including components for transmitting and receiving communication, such as a communication manager 1320, a network communication manager 1310, a transceiver 1315, an antenna 1325, a memory 1330, code 1335, a processor 1340, and an inter-station communication manager 1345. These components may be in electronic communication or otherwise coupled (for example, operatively, communicatively, functionally, electronically, electrically) via one or more buses (for example, a bus 1350).

The network communication manager 1310 may manage communication with a core network 130 (for example, via one or more wired backhaul links). For example, the network communication manager 1310 may manage the transfer of data communication for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (for example, when compiled and executed) to perform functions described herein. In some cases, the memory 1330 may contain, among other things, a BIOS, which may control basic hardware or software operation such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (for example, the memory 1330) to cause the device 1305 to perform various functions (for example, functions or tasks supporting techniques for indicating and updating transmission occasions). For example, the device 1305 or a component of the device 1305 may include a processor 1340 and memory 1330 coupled to the processor 1340, the processor 1340 and memory 1330 configured to perform various functions described herein.

The inter-station communication manager 1345 may manage communication with other base stations 105, and may include a controller or scheduler for controlling communication with UEs 115 in cooperation with other base stations 105. For example, the inter-station communication manager 1345 may coordinate scheduling for transmissions to UEs 115 for various interference mitigation techniques such as beamforming or joint transmission. In some examples, the inter-station communication manager 1345 may provide an X2 interface within an LTE/LTE-A wireless communication network technology to provide communication between base stations 105.

The communication manager 1320 may support wireless communication at a base station in accordance with examples as disclosed herein. For example, the communication manager 1320 may be configured as or otherwise support a means for transmitting, to a UE, control signaling identifying a first set of one or more parameters associated with semi-static communication with the UE in a full-duplex mode. The communication manager 1320 may be configured as or otherwise support a means for receiving, from the UE, first signaling indicating an empty uplink transmission occasion associated with the full-duplex mode. The communication manager 1320 may be configured as or otherwise support a means for transmitting, to the UE based on receiving the first signaling, a downlink signal in a downlink transmission occasion corresponding to the empty uplink transmission occasion according to a second set of one or more parameters associated with communication with the base station in a half-duplex mode.

Additionally or alternatively, the communication manager 1320 may support wireless communication at a base station in accordance with examples as disclosed herein. For example, the communication manager 1320 may be configured as or otherwise support a means for transmitting, to a UE, control signaling identifying a first set of one or more parameters associated with semi-static communication with the UE in a full-duplex mode. The communication manager 1320 may be configured as or otherwise support a means for transmitting, to the UE, first signaling indicating an empty downlink transmission occasion associated with the full-duplex mode. The communication manager 1320 may be configured as or otherwise support a means for receiving, from the UE based on transmitting the first signaling, an uplink signal in an uplink transmission occasion corresponding to the empty downlink transmission occasion in the full-duplex mode, the uplink signal received based on transmitting the first signaling and according to a second set of one or more parameters associated with communication with the UE in a half-duplex mode.

By including or configuring the communication manager 1320 in accordance with examples, the device 1305 may support techniques for latency reduction, improved spectral efficiency, and more efficient resource utilization. For example, operations performed by the device 1305 may provide improvements to CG and SPS communication. The operations performed by the device 1305 may additionally provide improvements to FD communication by reducing resource utilization associated with empty transmission occasions. In some other implementations, operations performed by the device 1305 may also support improvements to power consumption, reliability for UL and DL communication, spectral efficiency, higher data rates, and in some examples, low latency for UL and DL communication, among other benefits.

In some examples, the communication manager 1320 may be configured to perform various operations (for example, receiving, monitoring, transmitting) using or otherwise in cooperation with the transceiver 1315, the one or more antennas 1325, or any combination thereof. Although the communication manager 1320 is illustrated as a separate component, in some examples, one or more functions described with reference to the communication manager 1320 may be supported by or performed by the processor 1340, the memory 1330, the code 1335, or any combination thereof. For example, the code 1335 may include instructions executable by the processor 1340 to cause the device 1305 to perform various aspects of techniques for indicating and updating transmission occasions, or the processor 1340 and the memory 1330 may be otherwise configured to perform or support such operations.

Figure 14:
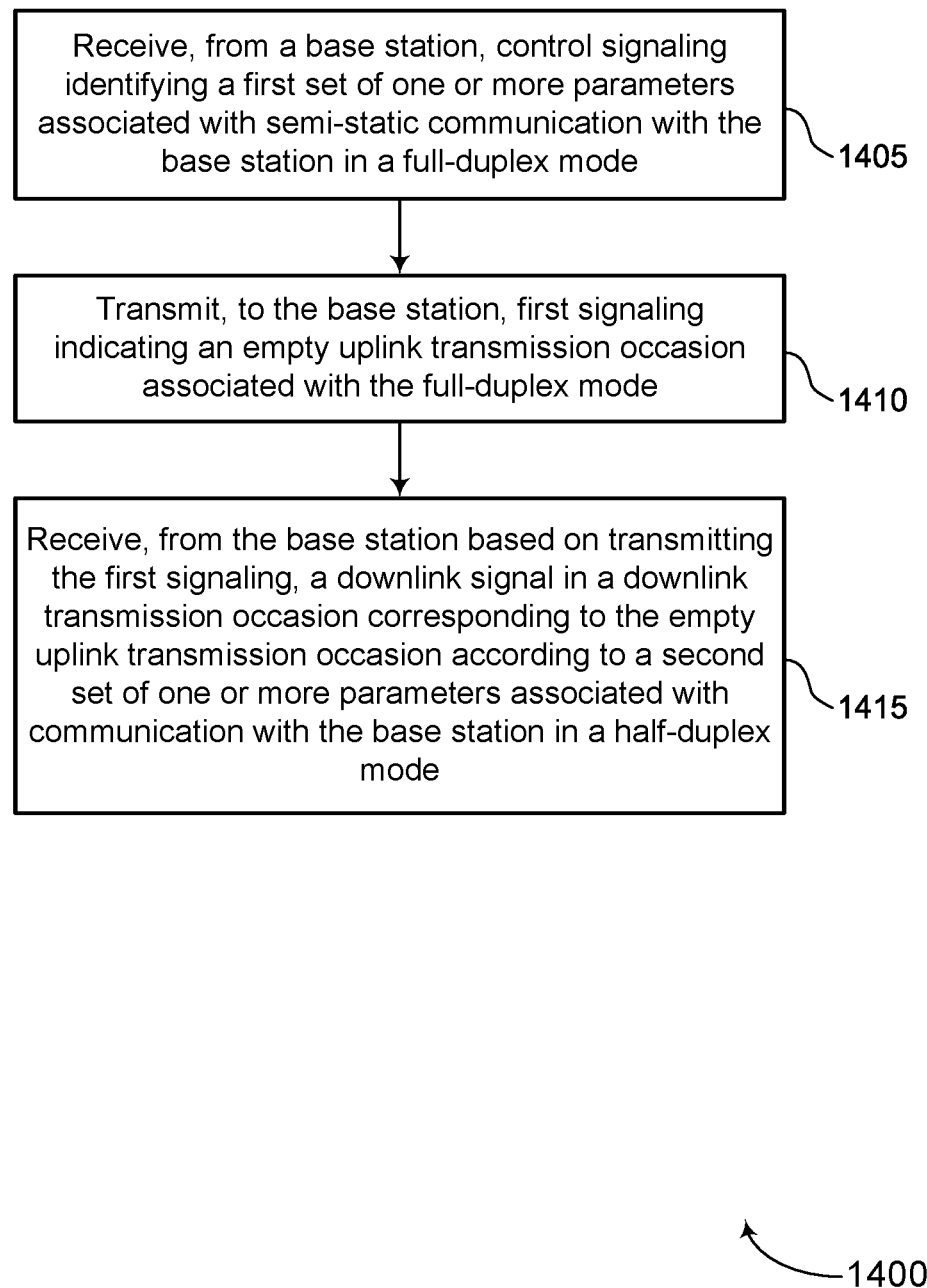
FIGS. 14 through 17 show flowcharts illustrating methods that support techniques for indicating and updating transmission occasions in accordance with aspects of the present disclosure.

FIG. 14 shows a flowchart illustrating a method 1400 that supports techniques for indicating and updating transmission occasions in accordance with aspects of the present disclosure. The operations of the method 1400 may be implemented by a UE or its components. For example, the operations of the method 1400 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling identifying a first set of one or more parameters associated with semi-static communication with the base station in a full-duplex mode. The operations of 1405 may be performed in accordance with examples as disclosed herein. In some examples, aspects of the operations of 1405 may be performed by a control signal receiver 825 as described with reference to FIG. 8.

At 1410, the method may include transmitting, to the base station, first signaling indicating an empty uplink transmission occasion associated with the full-duplex mode. The operations of 1410 may be performed in accordance with examples as disclosed herein. In some examples, aspects of the operations of 1410 may be performed by a signal transmitter 830 as described with reference to FIG. 8.

At 1415, the method may include receiving, from the base station based on transmitting the first signaling, a downlink signal in a downlink transmission occasion corresponding to the empty uplink transmission occasion according to a second set of one or more parameters associated with communication with the base station in a half-duplex mode. The operations of 1415 may be performed in accordance with examples as disclosed herein. In some examples, aspects of the operations of 1415 may be performed by a downlink signal receiver 835 as described with reference to FIG. 8.

Figure 15:
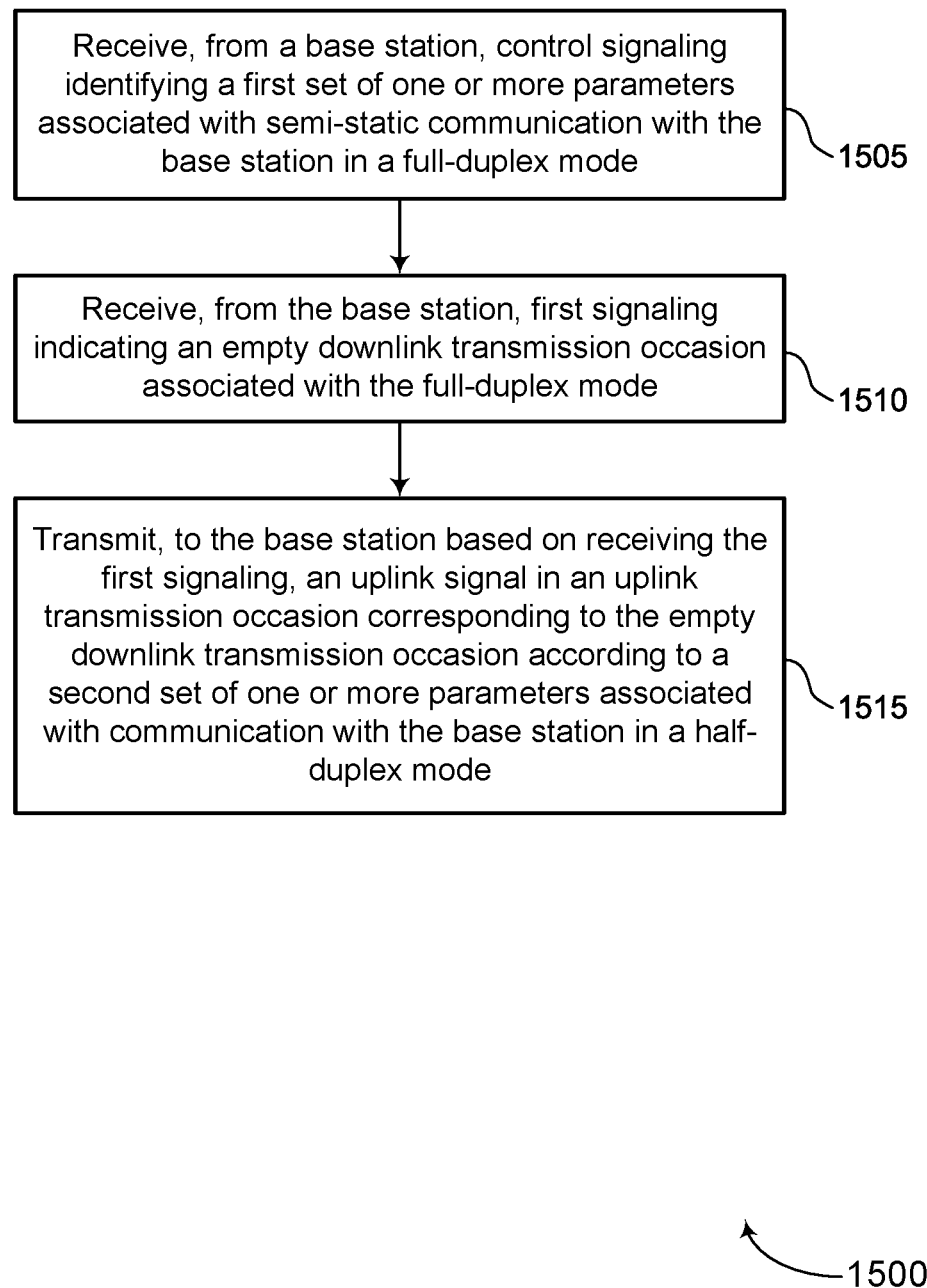

FIG. 15 shows a flowchart illustrating a method 1500 that supports techniques for indicating and updating transmission occasions in accordance with aspects of the present disclosure. The operations of the method 1500 may be implemented by a UE or its components. For example, the operations of the method 1500 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling identifying a first set of one or more parameters associated with semi-static communication with the base station in a full-duplex mode. The operations of 1505 may be performed in accordance with examples as disclosed herein. In some examples, aspects of the operations of 1505 may be performed by a control signal receiver 825 as described with reference to FIG. 8.

At 1510, the method may include receiving, from the base station, first signaling indicating an empty downlink transmission occasion associated with the full-duplex mode. The operations of 1510 may be performed in accordance with examples as disclosed herein. In some examples, aspects of the operations of 1510 may be performed by a signal receiver 840 as described with reference to FIG. 8.

At 1515, the method may include transmitting, to the base station based on receiving the first signaling, an uplink signal in an uplink transmission occasion corresponding to the empty downlink transmission occasion according to a second set of one or more parameters associated with communication with the base station in a half-duplex mode. The operations of 1515 may be performed in accordance with examples as disclosed herein. In some examples, aspects of the operations of 1515 may be performed by an uplink signal transmitter 845 as described with reference to FIG. 8.

Figure 16:
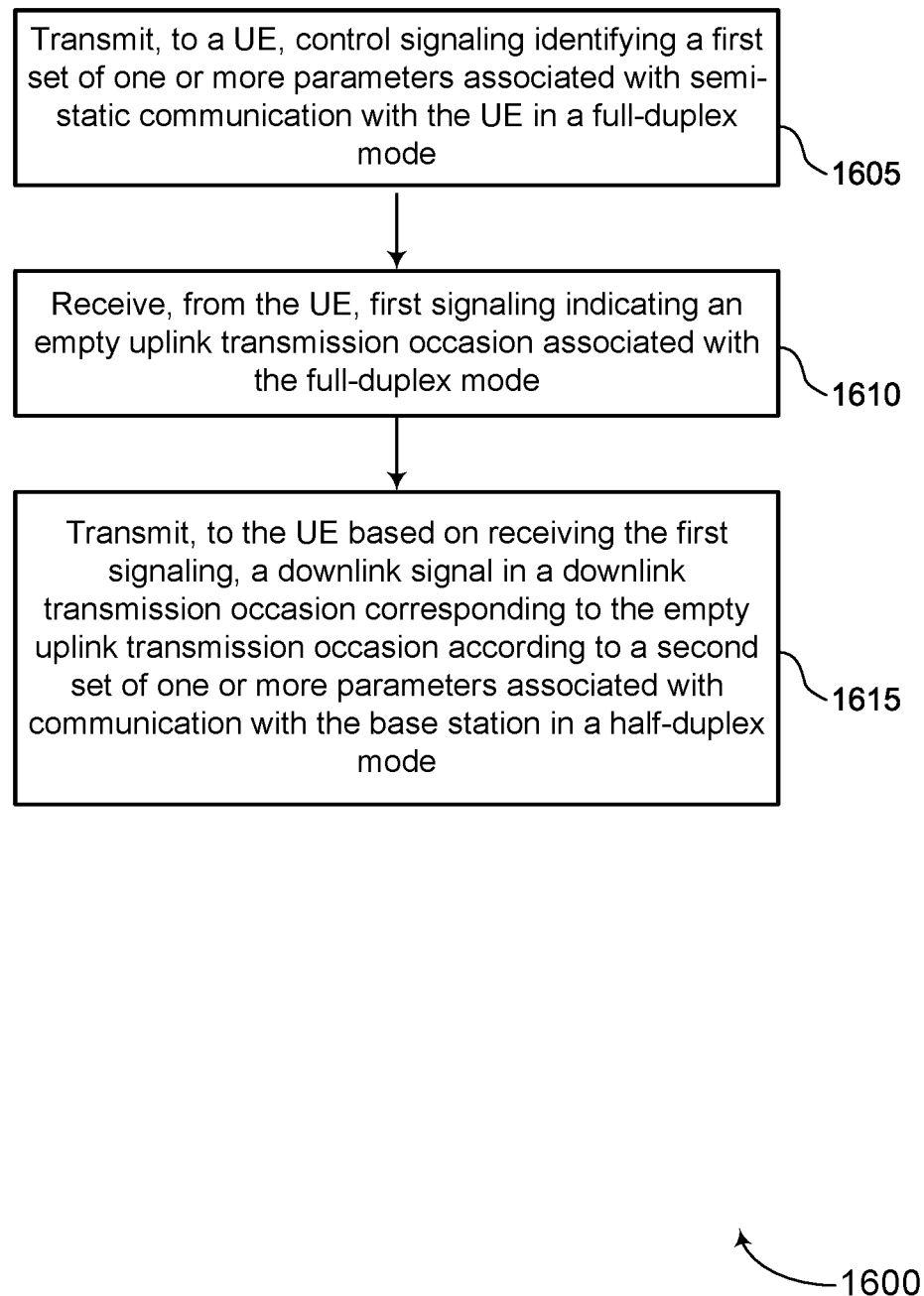

FIG. 16 shows a flowchart illustrating a method 1600 that supports techniques for indicating and updating transmission occasions in accordance with aspects of the present disclosure. The operations of the method 1600 may be implemented by a base station or its components. For example, the operations of the method 1600 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling identifying a first set of one or more parameters associated with semi-static communication with the UE in a full-duplex mode. The operations of 1605 may be performed in accordance with examples as disclosed herein. In some examples, aspects of the operations of 1605 may be performed by a control signal transmitter 1225 as described with reference to FIG. 12.

At 1610, the method may include receiving, from the UE, first signaling indicating an empty uplink transmission occasion associated with the full-duplex mode. The operations of 1610 may be performed in accordance with examples as disclosed herein. In some examples, aspects of the operations of 1610 may be performed by a signal receiver 1230 as described with reference to FIG. 12.

At 1615, the method may include transmitting, to the UE based on receiving the first signaling, a downlink signal in a downlink transmission occasion corresponding to the empty uplink transmission occasion according to a second set of one or more parameters associated with communication with the base station in a half-duplex mode. The operations of 1615 may be performed in accordance with examples as disclosed herein. In some examples, aspects of the operations of 1615 may be performed by a downlink signal transmitter 1235 as described with reference to FIG. 12.

Figure 17:
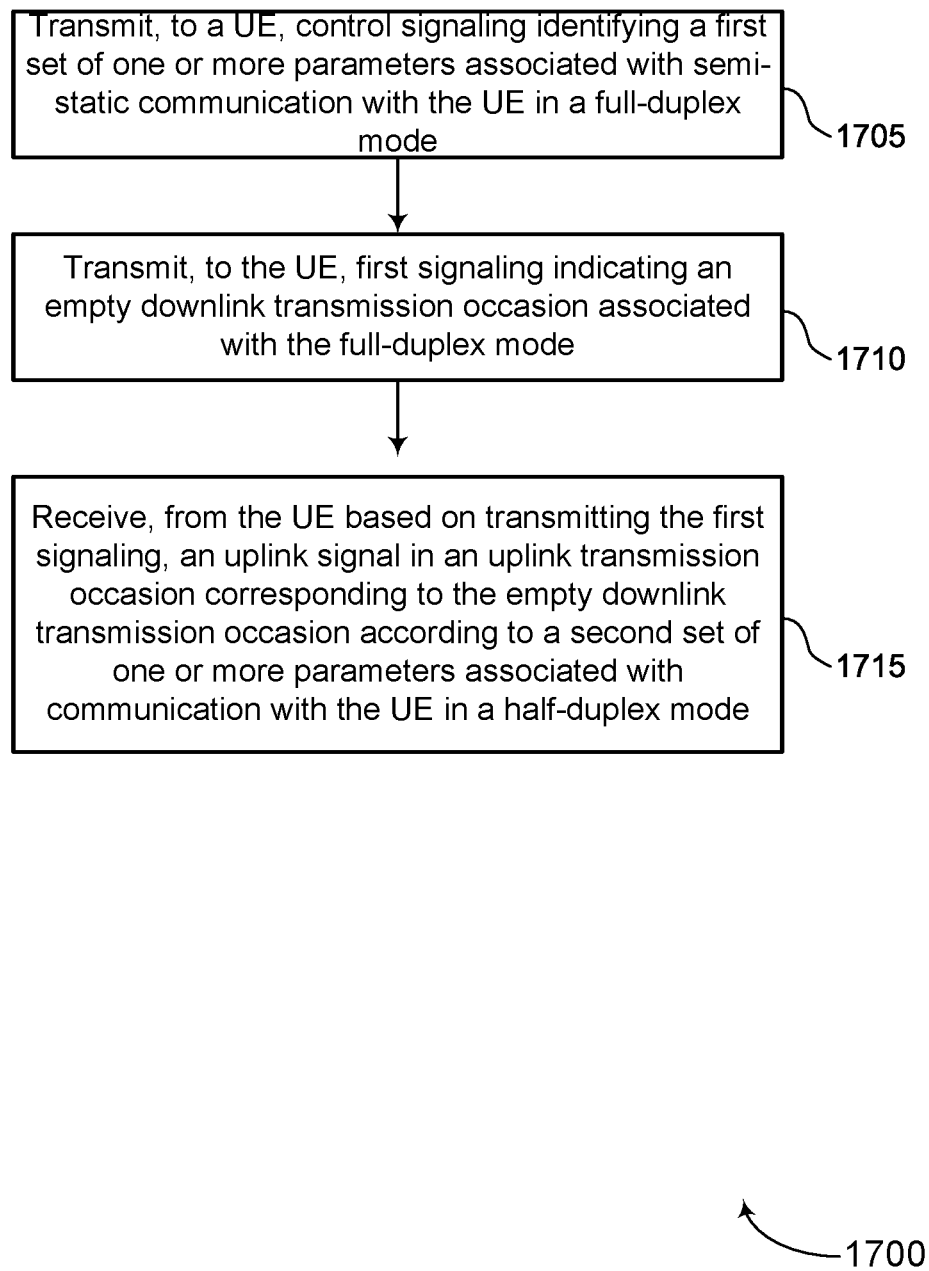

FIG. 17 shows a flowchart illustrating a method 1700 that supports techniques for indicating and updating transmission occasions in accordance with aspects of the present disclosure. The operations of the method 1700 may be implemented by a base station or its components. For example, the operations of the method 1700 may be performed by a base station 105 as described with reference to FIGS. 1-5 and 10-13. In some examples, a base station may execute a set of instructions to control the functional elements of the base station to perform the described functions.

Additionally or alternatively, the base station may perform aspects of the described functions using special-purpose hardware.

At 1705, the method may include transmitting, to a UE, control signaling identifying a first set of one or more parameters associated with semi-static communication with the UE in a full-duplex mode. The operations of 1705 may be performed in accordance with examples as disclosed herein. In some examples, aspects of the operations of 1705 may be performed by a control signal transmitter 1225 as described with reference to FIG. 12.

At 1710, the method may include transmitting, to the UE, first signaling indicating an empty downlink transmission occasion associated with the full-duplex mode. The operations of 1710 may be performed in accordance with examples as disclosed herein. In some examples, aspects of the operations of 1710 may be performed by a signal transmitter 1240 as described with reference to FIG. 12.

At 1715, the method may include receiving, from the UE based on transmitting the first signaling, an uplink signal in an uplink transmission occasion corresponding to the empty downlink transmission occasion according to a second set of one or more parameters associated with communication with the UE in a half-duplex mode. The operations of 1715 may be performed in accordance with examples as disclosed herein. In some examples, aspects of the operations of 1715 may be performed by an uplink signal receiver 1245 as described with reference to FIG. 12.

The following provides an overview of aspects of the present disclosure:

Aspect 1: A method for wireless communication at a UE, comprising: receiving, from a base station, control signaling identifying a first set of one or more parameters associated with semi-static communication with the base station in a full-duplex mode; transmitting, to the base station, first signaling indicating an empty uplink transmission occasion associated with the full-duplex mode; and receiving, from the base station based at least in part on transmitting the first signaling, a downlink signal in a downlink transmission occasion corresponding to the empty uplink transmission occasion according to a second set of one or more parameters associated with communication with the base station in a half-duplex mode.

Aspect 2: The method of aspect 1, further comprising: applying, at the UE, the second set of one or more based at least in part on identifying the empty uplink transmission occasion, wherein the downlink signal is received based at least in part on applying the second set of one or more parameters.

Aspect 3: The method of any of aspects 1 through 2, further comprising: receiving, from the base station, second control signaling indicating the second set of one or more parameters for the downlink transmission occasion.

Aspect 4: The method of aspect 3, wherein the second control signaling comprises a downlink control information message.

Aspect 5: The method of any of aspects 1 through 4, further comprising: receiving, from the base station, an indication of a switch flag associated with the half-duplex mode, wherein the downlink signal is received according to the second set of one or more parameters based at least in part on receiving the indication of the switch flag.

Aspect 6: The method of aspect 5, wherein the indication of the switch flag is received in one or more of a radio resource control message or a downlink control information message.

Aspect 7: The method of any of aspects 1 through 6, wherein the first signaling indicates the empty uplink transmission occasion based at least in part on the first signaling having a configuration identifier associated with the empty uplink transmission occasion.

Aspect 8: The method of aspect 7, wherein the first signaling further indicates one or more of a subset of uplink transmission occasions associated with the configuration identifier, a time window that includes uplink transmission occasions associated with the configuration identifier, or a starting uplink transmission occasion associated with the configuration identifier.

Aspect 9: The method of any of aspects 1 through 8, wherein the first signaling is transmitted based at least in part on the UE having no data to transmit in the empty uplink transmission occasion.

Aspect 10: The method of any of aspects 1 through 9, wherein the first set of one or more parameters comprise one or more of a first beam pair parameter, a first modulation and coding scheme, a first transmission power, a first precoder, a first rank indicator, a first timing advance value, or a first guard band parameter; and the second set of one or more parameters comprise one or more of a second beam pair parameter, a second modulation and coding scheme, a second transmission power, a second precoder, a second rank indicator, or a second timing advance value.

Aspect 11: The method of any of aspects 1 through 10, wherein the downlink transmission occasion comprises a semi-persistent scheduling occasion; and the empty uplink transmission occasion comprises a configured grant occasion.

Aspect 12: A method for wireless communication at a UE, comprising: receiving, from a base station, control signaling identifying a first set of one or more parameters associated with semi-static communication with the base station in a full-duplex mode; receiving, from the base station, first signaling indicating an empty downlink transmission occasion associated with the full-duplex mode; and transmitting, to the base station based at least in part on receiving the first signaling, an uplink signal in an uplink transmission occasion corresponding to the empty downlink transmission occasion according to a second set of one or more parameters associated with communication with the base station in a half-duplex mode.

Aspect 13: The method of aspect 12, further comprising: applying, at the UE, the second set of one or more parameters based at least in part on receiving the first signaling indicating the empty downlink transmission occasion, wherein the uplink signal is transmitted based at least in part on applying the second set of one or more parameters.

Aspect 14: The method of any of aspects 12 through 13, further comprising: receiving, from the base station, second control signaling indicating the second set of one or more parameters for the uplink transmission occasion, wherein the uplink signal is transmitted based at least in part on the second set of one or more parameters indicated in the second control signaling.

Aspect 15: The method of aspect 14, wherein the second control signaling comprises a downlink control information message.

Aspect 16: The method of any of aspects 12 through 15, further comprising: receiving, from the base station, an indication of a switch flag associated with the half-duplex mode, wherein the uplink signal is transmitted according to the second set of one or more parameters based at least in part on receiving the indication of the switch flag.

Aspect 17: The method of aspect 16, wherein the indication of the switch flag is received in one or more of a radio resource control message or a downlink control information message.

Aspect 18: The method of any of aspects 12 through 17, wherein the first signaling indicates the empty downlink transmission occasion based at least in part on the first signaling having a configuration identifier associated with the empty downlink transmission occasion.

Aspect 19: The method of aspect 18, wherein the first signaling further indicates one or more of a subset of downlink transmission occasions associated with the configuration identifier, a time window that includes downlink transmission occasions associated with the configuration identifier, or a starting downlink transmission occasion associated with the configuration identifier.

Aspect 20: The method of any of aspects 12 through 19, wherein the first set of one or more parameters comprise one or more of a first beam pair parameter, a first modulation and coding scheme, a first transmission power, a first precoder, a first rank indicator, a first timing advance value, or a first guard band parameter; and the second set of one or more parameters comprise one or more of a second beam pair parameter, a second modulation and coding scheme, a second transmission power, a second precoder, a second rank indicator, or a second timing advance value.

Aspect 21: The method of any of aspects 12 through 20, wherein the empty downlink transmission occasion comprises a semi-persistent scheduling occasion; and the uplink transmission occasion comprises a configured grant occasion.

Aspect 22: A method for wireless communication at a base station, comprising: transmitting, to a UE, control signaling identifying a first set of one or more parameters associated with semi-static communication with the UE in a full-duplex mode; receiving, from the UE, first signaling indicating an empty uplink transmission occasion associated with the full-duplex mode; and transmitting, to the UE based at least in part on receiving the first signaling, a downlink signal in a downlink transmission occasion corresponding to the empty uplink transmission occasion according to a second set of one or more parameters associated with communication with the base station in a half-duplex mode.

Aspect 23: The method of aspect 22, further comprising: applying, at the base station, the second set of one or more parameters based at least in part on receiving the first signaling indicating the empty uplink transmission occasion, wherein the downlink signal is transmitted based at least in part on applying the second set of one or more parameters.

Aspect 24: The method of any of aspects 22 through 23, further comprising: transmitting, to the UE, second control signaling indicating the second set of one or more parameters for the downlink transmission occasion.

Aspect 25: The method of aspect 24, wherein the second control signaling comprises a downlink control information message.

Aspect 26: The method of any of aspects 22 through 25, further comprising: transmitting, to the UE, an indication of a switch flag associated with the half-duplex mode, wherein the downlink signal is transmitted according to the second set of one or more parameters based at least in part on transmitting the indication of the switch flag.

Aspect 27: The method of aspect 26, wherein the indication of the switch flag is transmitted in one or more of a radio resource control message or a downlink control information message.

Aspect 28: The method of any of aspects 22 through 27, wherein the first signaling indicates the empty uplink transmission occasion based at least in part on the first signaling having a configuration identifier associated with the empty uplink transmission occasion.

Aspect 29: The method of aspect 28, wherein the first signaling further indicates one or more of a subset of uplink transmission occasions associated with the configuration identifier, a time window that includes uplink transmission occasions associated with the configuration identifier, or a starting uplink transmission occasion associated with the configuration identifier.

Aspect 30: The method of any of aspects 22 through 29, wherein the first set of one or more parameters comprise one or more of a first beam pair parameter, a first modulation and coding scheme, a first transmission power, a first precoder, a first rank indicator, a first timing advance value, or a first guard band parameter; and the second set of one or more parameters comprise one or more of a second beam pair parameter, a second modulation and coding scheme, a second transmission power, a second precoder, a second rank indicator, or a second timing advance value.

Aspect 31: The method of any of aspects 22 through 30, wherein the downlink transmission occasion comprises a semi-persistent scheduling occasion; and the empty uplink transmission occasion comprises a configured grant occasion.

Aspect 32: A method for wireless communication at a base station, comprising: transmitting, to a UE, control signaling identifying a first set of one or more parameters associated with semi-static communication with the UE in a full-duplex mode; transmitting, to the UE, first signaling indicating an empty downlink transmission occasion associated with the full-duplex mode; and receiving, from the UE based at least in part on transmitting the first signaling, an uplink signal in an uplink transmission occasion corresponding to the empty downlink transmission occasion according to a second set of one or more parameters associated with communication with the UE in a half-duplex mode.

Aspect 33: The method of aspect 32, further comprising: applying, at the base station, the second set of one or more parameters based at least in part on identifying the empty downlink transmission occasion, wherein the uplink signal is received based at least in part on applying the second set of one or more parameters.

Aspect 34: The method of any of aspects 32 through 33, further comprising: transmitting, to the UE, second control signaling indicating the second set of one or more parameters for the uplink transmission occasion.

Aspect 35: The method of aspect 34, wherein the second control signaling comprises a downlink control information message.

Aspect 36: The method of any of aspects 32 through 35, further comprising: transmitting, to the UE, an indication of a switch flag associated with the half-duplex mode, wherein the uplink signal is received according to the second set of one or more parameters based at least in part on transmitting the indication of the switch flag.

Aspect 37: The method of aspect 36, wherein the indication of the switch flag is transmitted in one or more of a radio resource control message or a downlink control information message.

Aspect 38: The method of any of aspects 32 through 37, wherein the first signaling indicates the empty downlink transmission occasion based at least in part on the first signaling having a configuration identifier associated with the empty downlink transmission occasion.

Aspect 39: The method of aspect 38, wherein the first signaling further indicates one or more of a subset of downlink transmission occasions associated with the configuration identifier, a time window that includes downlink transmission occasions associated with the configuration identifier, or a starting downlink transmission occasion associated with the configuration identifier.

Aspect 40: The method of any of aspects 32 through 39, wherein the first signaling is transmitted based at least in part on the base station having no data to transmit in the empty downlink transmission occasion.

Aspect 41: The method of any of aspects 32 through 40, wherein the first set of one or more parameters comprise one or more of a first beam pair parameter, a first modulation and coding scheme, a first transmission power, a first precoder, a first rank indicator, a first timing advance value, or a first guard band parameter; and the second set of one or more parameters comprise one or more of a second beam pair parameter, a second modulation and coding scheme, a second transmission power, a second precoder, a second rank indicator, or a second timing advance value.

Aspect 42: The method of any of aspects 32 through 41, wherein the empty downlink transmission occasion comprises a semi-persistent scheduling occasion; and the uplink transmission occasion comprises a configured grant occasion.

Aspect 43: An apparatus for wireless communication at a UE, comprising a processor; memory coupled with the processor; and instructions stored in the memory and executable by the processor to cause the apparatus to perform a method of any of aspects 1 through 11.

Aspect 44: An apparatus for wireless communication at a UE, comprising at least one means for performing a method of any of aspects 1 through 11.

Aspect 45: A non-transitory computer-readable medium storing code for wireless communication at a UE, the code comprising instructions executable by a processor to perform a method of any of aspects 1 through 11.

Aspect 46: An apparatus for wireless communication at a UE, comprising a processor; memory coupled with the processor; and instructions stored in the memory and executable by the processor to cause the apparatus to perform a method of any of aspects 12 through 21.

Aspect 47: An apparatus for wireless communication at a UE, comprising at least one means for performing a method of any of aspects 12 through 21.

Aspect 48: A non-transitory computer-readable medium storing code for wireless communication at a UE, the code comprising instructions executable by a processor to perform a method of any of aspects 12 through 21.

Aspect 49: An apparatus for wireless communication at a base station, comprising a processor; memory coupled with the processor; and instructions stored in the memory and executable by the processor to cause the apparatus to perform a method of any of aspects 22 through 31.

Aspect 50: An apparatus for wireless communication at a base station, comprising at least one means for performing a method of any of aspects 22 through 31.

Aspect 51: A non-transitory computer-readable medium storing code for wireless communication at a base station, the code comprising instructions executable by a processor to perform a method of any of aspects 22 through 31.

Aspect 52: An apparatus for wireless communication at a base station, comprising a processor; memory coupled with the processor; and instructions stored in the memory and executable by the processor to cause the apparatus to perform a method of any of aspects 32 through 42.

Aspect 53: An apparatus for wireless communication at a base station, comprising at least one means for performing a method of any of aspects 32 through 42.

Aspect 54: A non-transitory computer-readable medium storing code for wireless communication at a base station, the code comprising instructions executable by a processor to perform a method of any of aspects 32 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc, in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and other examples. Also, "determining" can include receiving (such as receiving information), accessing (such as accessing data in a memory) and other examples. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a user equipment (UE), comprising:
    receiving, from a network entity, control signaling identifying a first set of one or more parameters associated with semi-static communication with the network entity in a full-duplex mode;
    receiving, from the network entity, first signaling indicating an empty downlink transmission occasion associated with the full-duplex mode; and
    transmitting, to the network entity and after receiving the first signaling, an uplink signal in a uplink transmission occasion corresponding to the empty downlink transmission occasion according to a second set of one or more parameters associated with communication with the network entity in a half-duplex mode.

2. The method of claim 1, further comprising applying the second set of one or more parameters in association with receiving the first signaling indicating the empty downlink transmission occasion, wherein the uplink signal is transmitted in association with applying the second set of one or more parameters.

3. The method of claim 1, further comprising receiving, from the network entity, second control signaling indicating the second set of one or more parameters for the uplink transmission occasion.

4. The method of claim 1, further comprising receiving, from the network entity, an indication of a switch flag associated with the half-duplex mode, wherein the uplink signal is transmitted in association with receiving the indication of the switch flag.

5. The method of claim 1, wherein the first signaling comprises a configuration identifier associated with the empty downlink transmission occasion.

6. The method of claim 5, wherein the first signaling further indicates one or more of a subset of downlink transmission occasions associated with the configuration identifier, a time window that includes downlink transmission occasions associated with the configuration identifier, or a starting downlink transmission occasion associated with the configuration identifier.

7. The method of claim 1, wherein:
    the first set of one or more parameters comprise one or more of a first beam pair parameter, a first modulation and coding scheme, a first transmission power, a first precoder, a first rank indicator, a first timing advance value, or a first guard band parameter; and
    the second set of one or more parameters comprise one or more of a second beam pair parameter, a second modulation and coding scheme, a second transmission power, a second precoder, a second rank indicator, or a second timing advance value.

8. A method for wireless communication by a network entity, comprising:
transmitting, to a user equipment (UE), control signaling identifying a first set of one or more parameters associated with semi-static communication with the UE in a full-duplex mode;
transmitting, to the UE, first signaling indicating an empty downlink transmission occasion associated with the full-duplex mode; and
receiving, from the UE after transmitting the first signaling, an uplink signal in an uplink transmission occasion corresponding to the empty downlink transmission occasion according to a second set of one or more parameters associated with communication with the UE in a half-duplex mode.

9. The method of claim 8, further comprising applying the second set of one or more parameters in association with identifying the empty downlink transmission occasion, wherein the uplink signal is received in association with applying the second set of one or more parameters.

10. The method of claim 8, further comprising transmitting, to the UE, second control signaling indicating the second set of one or more parameters for the uplink transmission occasion.

11. The method of claim 8, further comprising transmitting, to the UE, an indication of a switch flag associated with the half-duplex mode, wherein the uplink signal is received in association with transmitting the indication of the switch flag.

12. The method of claim 8, wherein the first signaling comprises a configuration identifier associated with the empty downlink transmission occasion.

13. The method of claim 12, wherein the first signaling further indicates one or more of a subset of downlink transmission occasions associated with the configuration identifier, a time window that includes downlink transmission occasions associated with the configuration identifier, or a starting downlink transmission occasion associated with the configuration identifier.

14. The method of claim 8, wherein:
the first set of one or more parameters comprise one or more of a first beam pair parameter, a first modulation and coding scheme, a first transmission power, a first precoder, a first rank indicator, a first timing advance value, or a first guard band parameter; and
the second set of one or more parameters comprise one or more of a second beam pair parameter, a second modulation and coding scheme, a second transmission power, a second precoder, a second rank indicator, or a second timing advance value.

15. The method of claim 8, wherein the first signaling is transmitted in association with the network entity having no data to transmit in the empty downlink transmission occasion.

16. A user equipment (UE) for wireless communication, comprising:
one or more processors; and
one or more memories coupled with the one or more processors and storing processor-executable code that, when executed by the one or more processors, is configured to cause the UE to:
receive, from a network entity, control signaling identifying a first set of one or more parameters associated with semi-static communication with the network entity in a full-duplex mode;
receive, from the network entity, first signaling indicating an empty downlink transmission occasion associated with the full-duplex mode; and
transmit, to the network entity after receipt of the first signaling, an uplink signal in a uplink transmission occasion corresponding to the empty downlink transmission occasion according to a second set of one or more parameters associated with communication with the network entity in a half-duplex mode.

17. The UE of claim 16, wherein the processor-executable code, when executed by the one or more processors, is further configured to cause the UE to:
apply the second set of one or more parameters in association with receipt of the first signaling indicating the empty downlink transmission occasion, wherein the uplink signal is transmitted in association with the second set of one or more parameters being applied.

18. The UE of claim 16, wherein the processor-executable code, when executed by the one or more processors, is further configured to cause the UE to:
receive, from the network entity, second control signaling indicating the second set of one or more parameters for the uplink transmission occasion.

19. The UE of claim 16, wherein the processor-executable code, when executed by the one or more processors, is further configured to cause the UE to:
receive, from the network entity, an indication of a switch flag associated with the half-duplex mode, wherein the uplink signal is transmitted in association with receipt of the indication of the switch flag.

20. The UE of claim 16, wherein the first signaling comprises a configuration identifier associated with the empty downlink transmission occasion.

21. The UE of claim 20, wherein the first signaling further indicates one or more of a subset of downlink transmission occasions associated with the configuration identifier, a time window that includes downlink transmission occasions associated with the configuration identifier, or a starting downlink transmission occasion associated with the configuration identifier.

22. The UE of claim 16, wherein:
the first set of one or more parameters comprise one or more of a first beam pair parameter, a first modulation and coding scheme, a first transmission power, a first precoder, a first rank indicator, a first timing advance value, or a first guard band parameter; and
the second set of one or more parameters comprise one or more of a second beam pair parameter, a second modulation and coding scheme, a second transmission power, a second precoder, a second rank indicator, or a second timing advance value.

23. A network entity for wireless communication, comprising:
one or more processors; and
one or more memories coupled with the one or more processors and storing processor-executable code that, when executed by the one or more processors, is configured to cause the network entity to:
transmit, to a user equipment (UE), control signaling identifying a first set of one or more parameters associated with semi-static communication with the UE in a full-duplex mode;
transmit, to the UE, first signaling indicating an empty downlink transmission occasion associated with the full-duplex mode; and
receive, from the UE after transmission of the first signaling, an uplink signal in an uplink transmission occasion corresponding to the empty downlink transmission occasion according to a second set of one or more parameters associated with communication with the UE in a half-duplex mode.

24. The network entity of claim 23, wherein the processor-executable code, when executed by the one or more processors, is further configured to cause the network entity to:
apply the second set of one or more parameters in association with identification of the empty downlink transmission occasion, wherein the uplink signal is received in association with the second set of one or more parameters being applied.

25. The network entity of claim 23, wherein the processor-executable code, when executed by the one or more processors, is further configured to cause the network entity to:
transmit, to the UE, second control signaling indicating the second set of one or more parameters for the uplink transmission occasion.

26. The network entity of claim 23, wherein the processor-executable code, when executed by the one or more processors, is further configured to cause the network entity to:
transmit, to the UE, an indication of a switch flag associated with the half-duplex mode, wherein the uplink signal is received in association with transmission of the indication of the switch flag.

27. The network entity of claim 23, wherein the first signaling comprises a configuration identifier associated with the empty downlink transmission occasion.

28. The network entity of claim 27, wherein the first signaling further indicates one or more of a subset of downlink transmission occasions associated with the configuration identifier, a time window that includes downlink transmission occasions associated with the configuration identifier, or a starting downlink transmission occasion associated with the configuration identifier.

29. The network entity of claim 23, wherein:
the first set of one or more parameters comprise one or more of a first beam pair parameter, a first modulation and coding scheme, a first transmission power, a first precoder, a first rank indicator, a first timing advance value, or a first guard band parameter; and
the second set of one or more parameters comprise one or more of a second beam pair parameter, a second modulation and coding scheme, a second transmission power, a second precoder, a second rank indicator, or a second timing advance value.

30. The network entity of claim 23, wherein the first signaling is transmitted in association with the network entity having no data to transmit in the empty downlink transmission occasion.

* * * * *